Jan. 1, 1957     E. A. EDWARDS ET AL     2,776,094
AUTOMATIC SPOOLING MACHINE FOR ROLL FILM
Filed Dec. 21, 1953     23 Sheets-Sheet 1
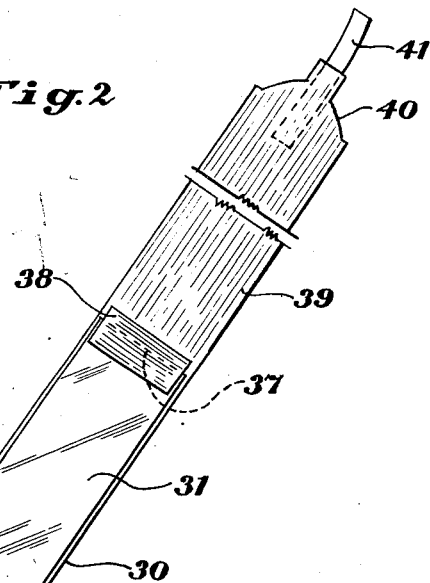
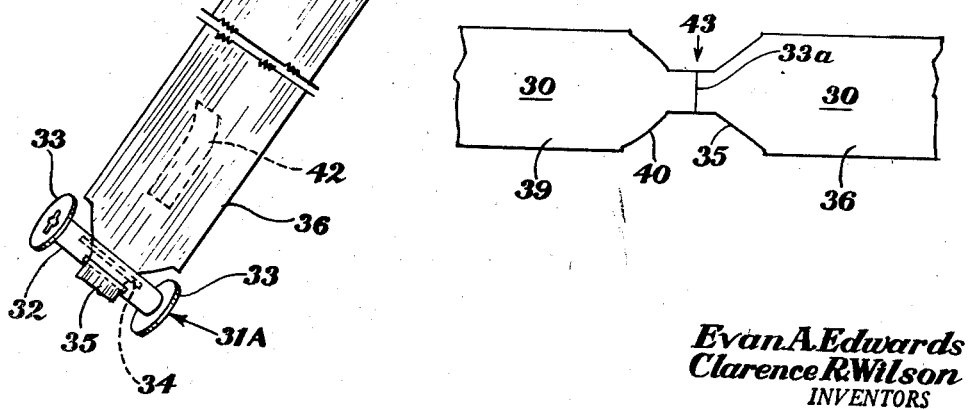
Evan A. Edwards
Clarence R. Wilson
INVENTORS
BY
ATTORNEYS

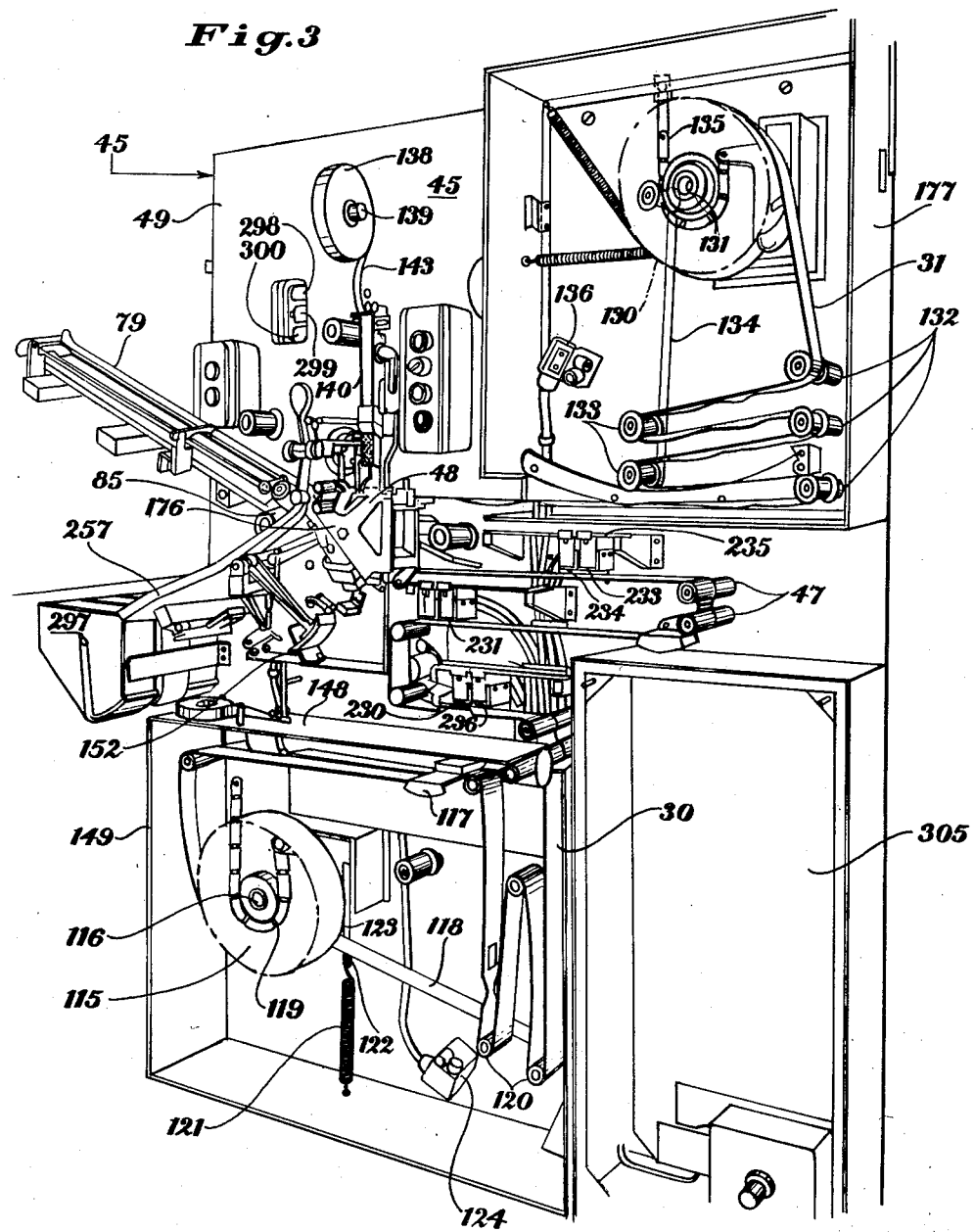

Jan. 1, 1957   E. A. EDWARDS ET AL   2,776,094
AUTOMATIC SPOOLING MACHINE FOR ROLL FILM
Filed Dec. 21, 1953   23 Sheets-Sheet 4

Evan A. Edwards
Clarence R. Wilson
INVENTORS

BY
ATTORNEYS

Jan. 1, 1957 E. A. EDWARDS ET AL 2,776,094
AUTOMATIC SPOOLING MACHINE FOR ROLL FILM
Filed Dec. 21, 1953 23 Sheets-Sheet 7

Evan A. Edwards
Clarence R. Wilson
INVENTORS

Evan A. Edwards
Clarence R. Wilson
INVENTORS

Jan. 1, 1957  E. A. EDWARDS ET AL  2,776,094
AUTOMATIC SPOOLING MACHINE FOR ROLL FILM
Filed Dec. 21, 1953  23 Sheets-Sheet 9
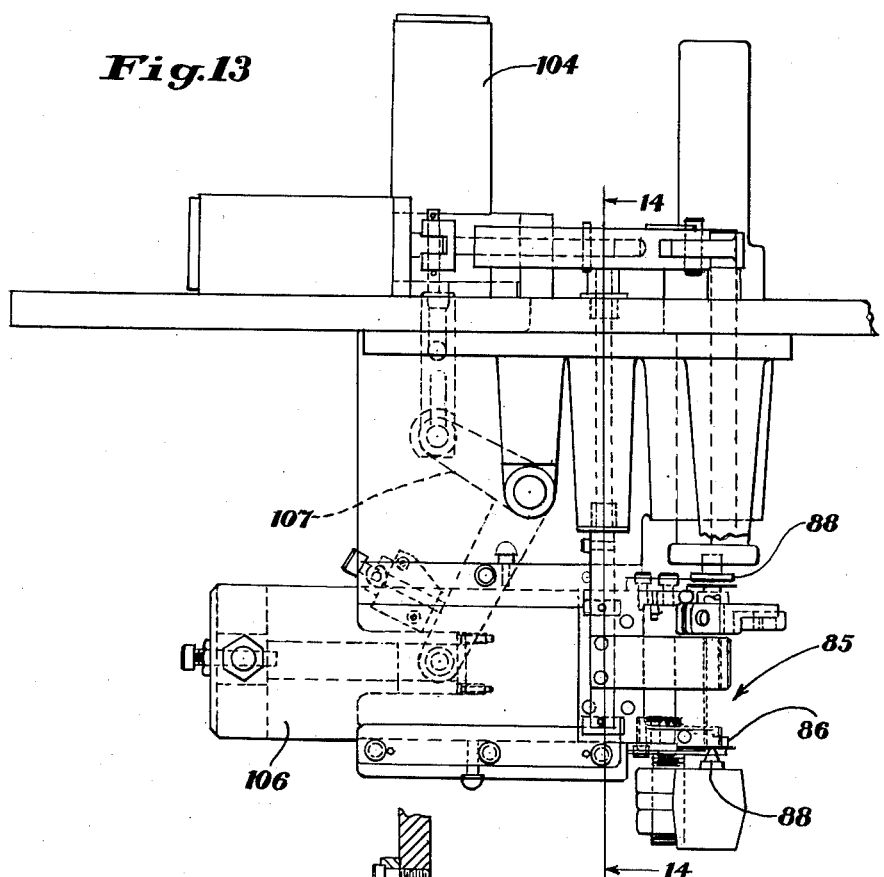
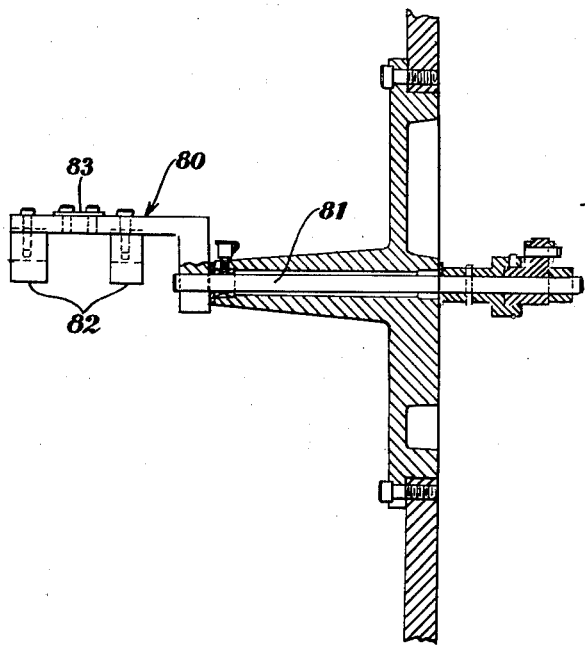
Evan A. Edwards
Clarence R. Wilson
INVENTORS
BY
ATTORNEYS

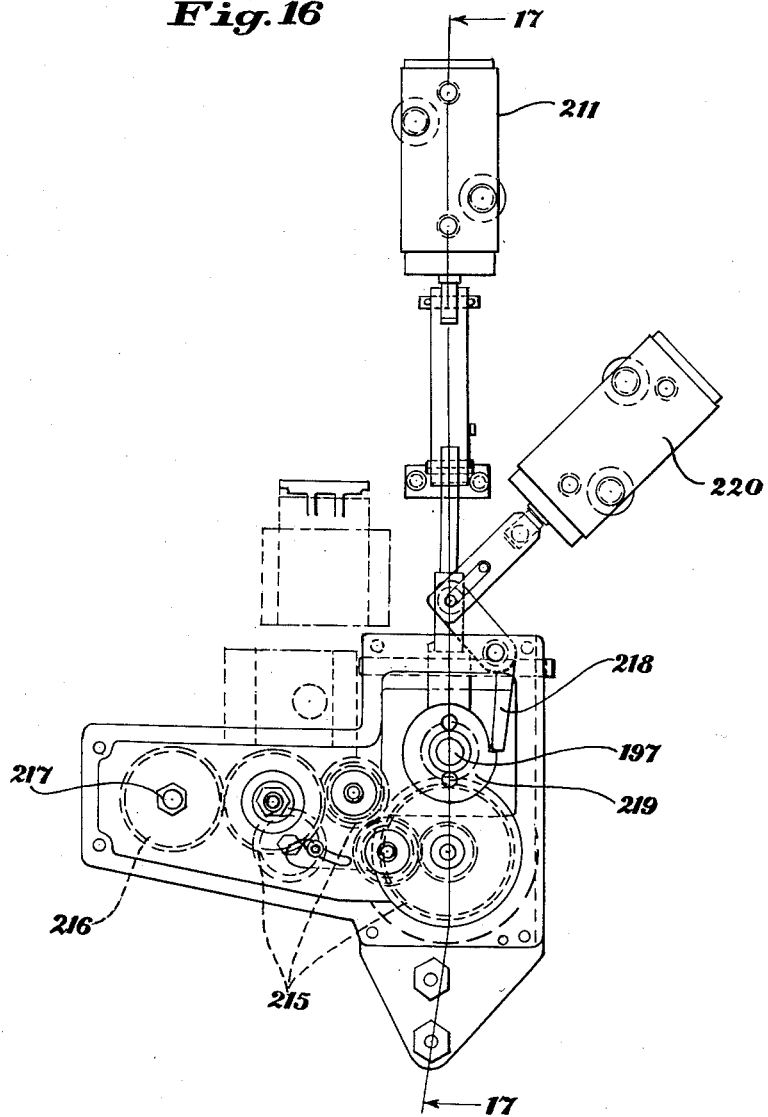

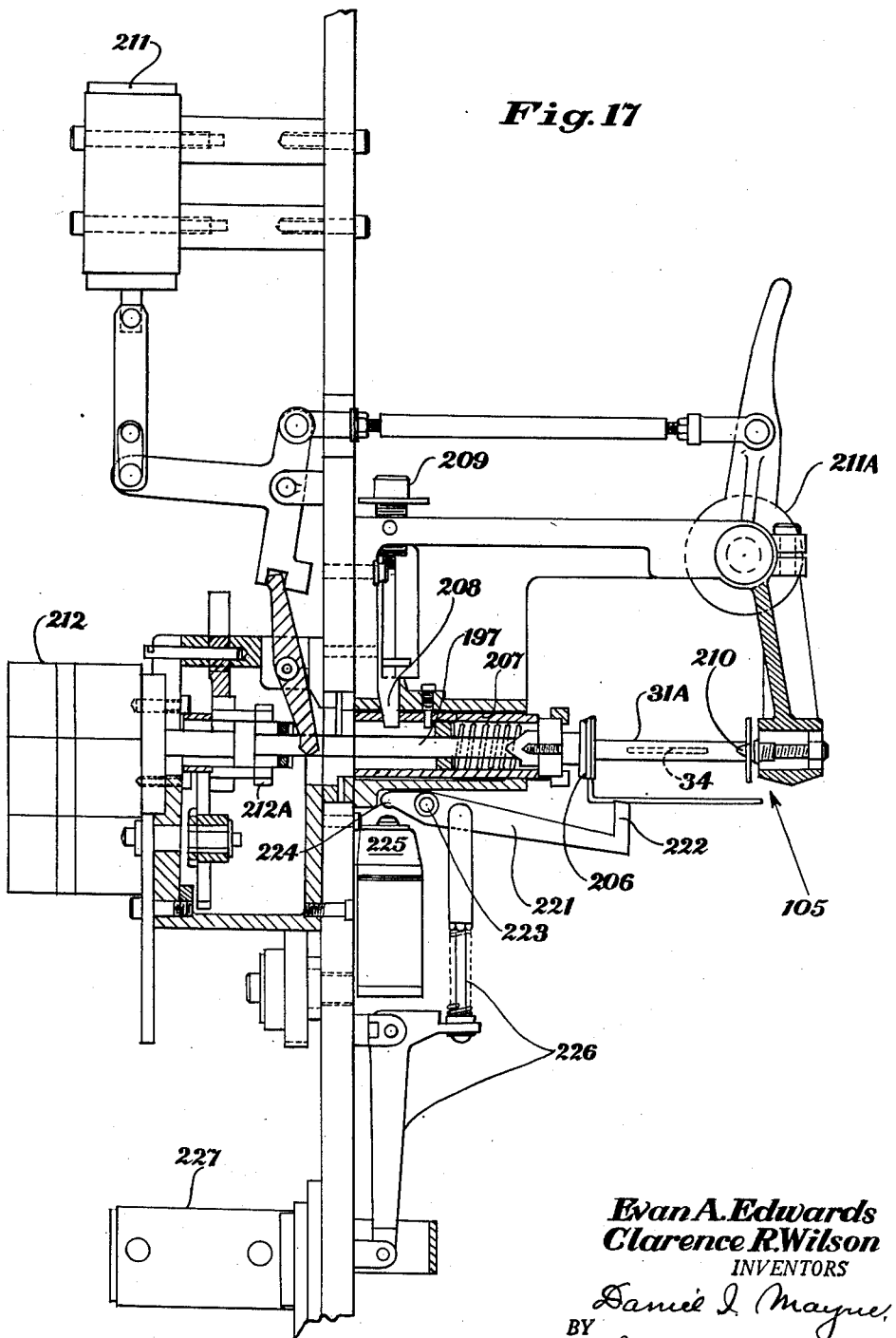

Jan. 1, 1957    E. A. EDWARDS ET AL    2,776,094
AUTOMATIC SPOOLING MACHINE FOR ROLL FILM
Filed Dec. 21, 1953    23 Sheets-Sheet 13
*Fig. 19*
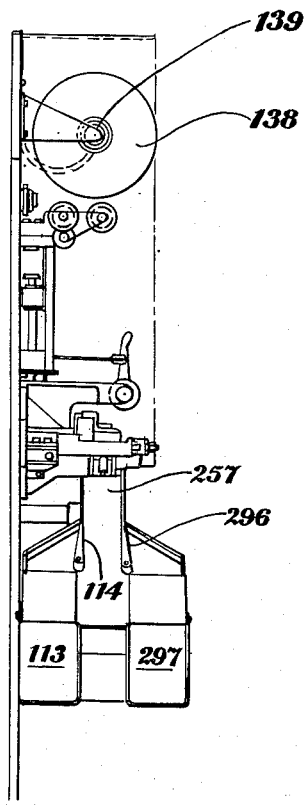
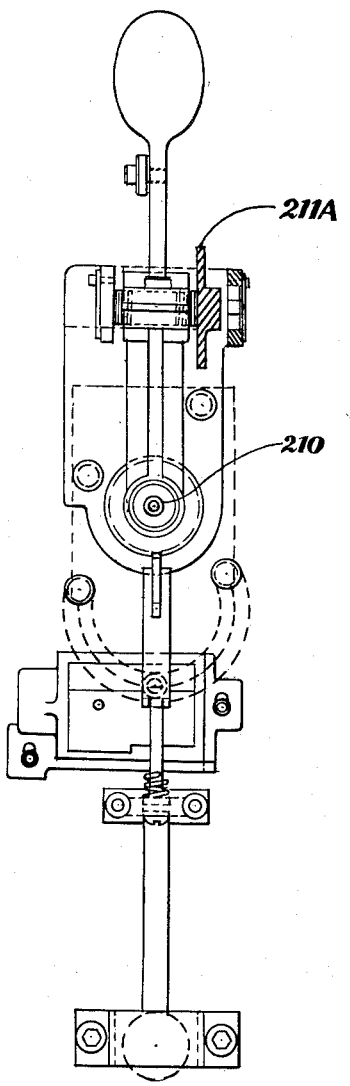
*Fig. 18*
Evan A. Edwards
Clarence R. Wilson
INVENTORS
BY
ATTORNEYS Jan. 1, 1957 E. A. EDWARDS ET AL 2,776,094
AUTOMATIC SPOOLING MACHINE FOR ROLL FILM
Filed Dec. 21, 1953 23 Sheets-Sheet 14
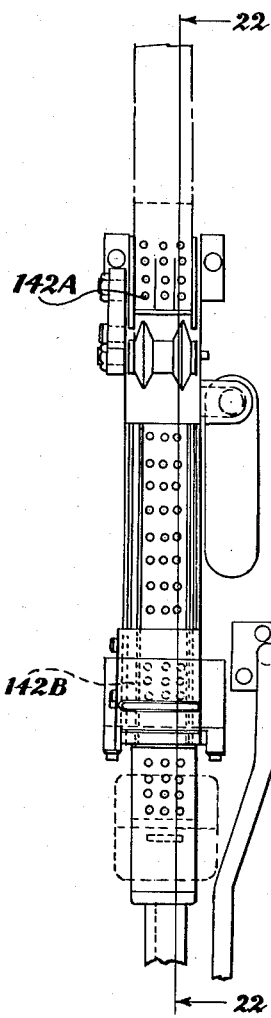
Evan A. Edwards
Clarence R. Wilson
INVENTORS
BY
ATTORNEYS

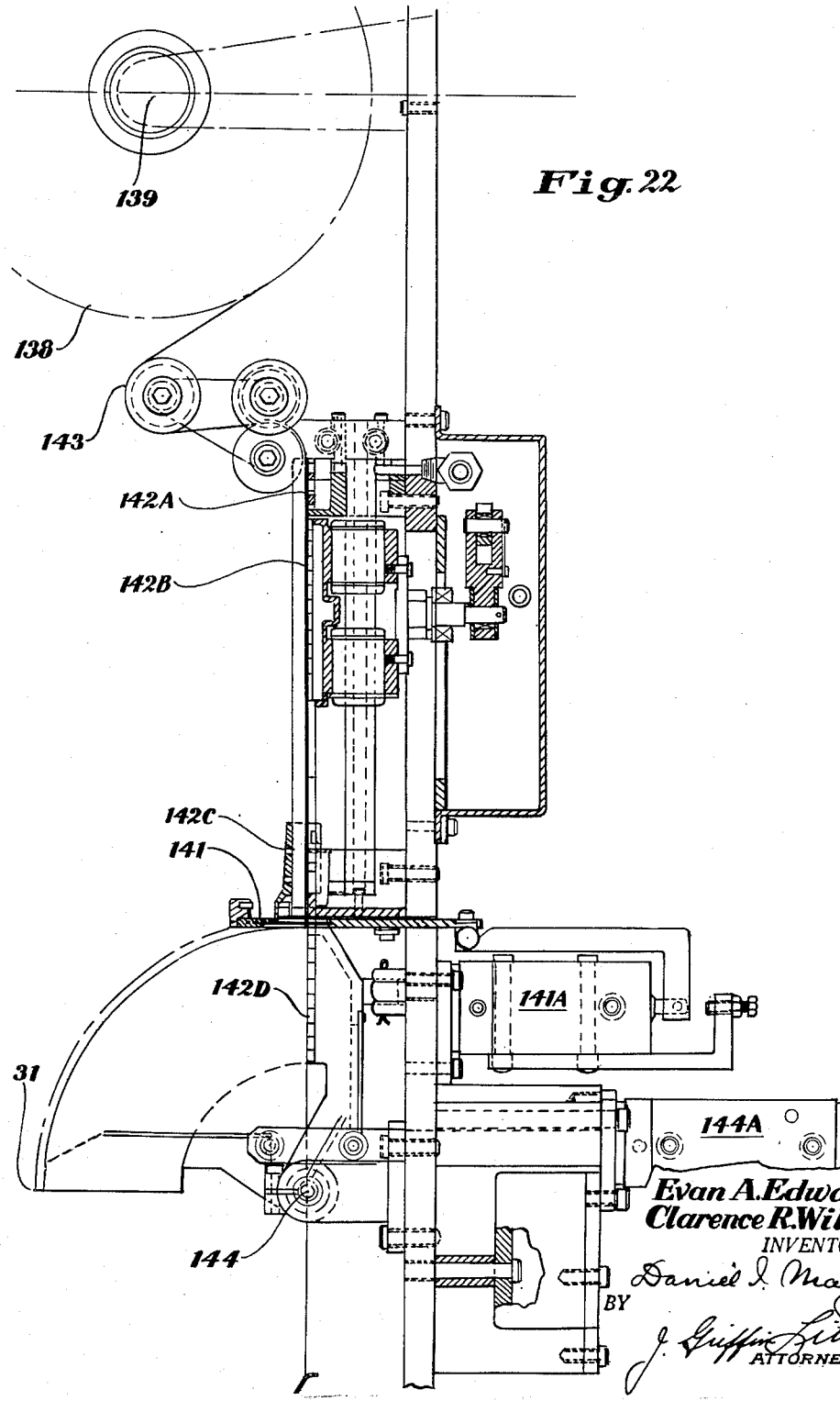

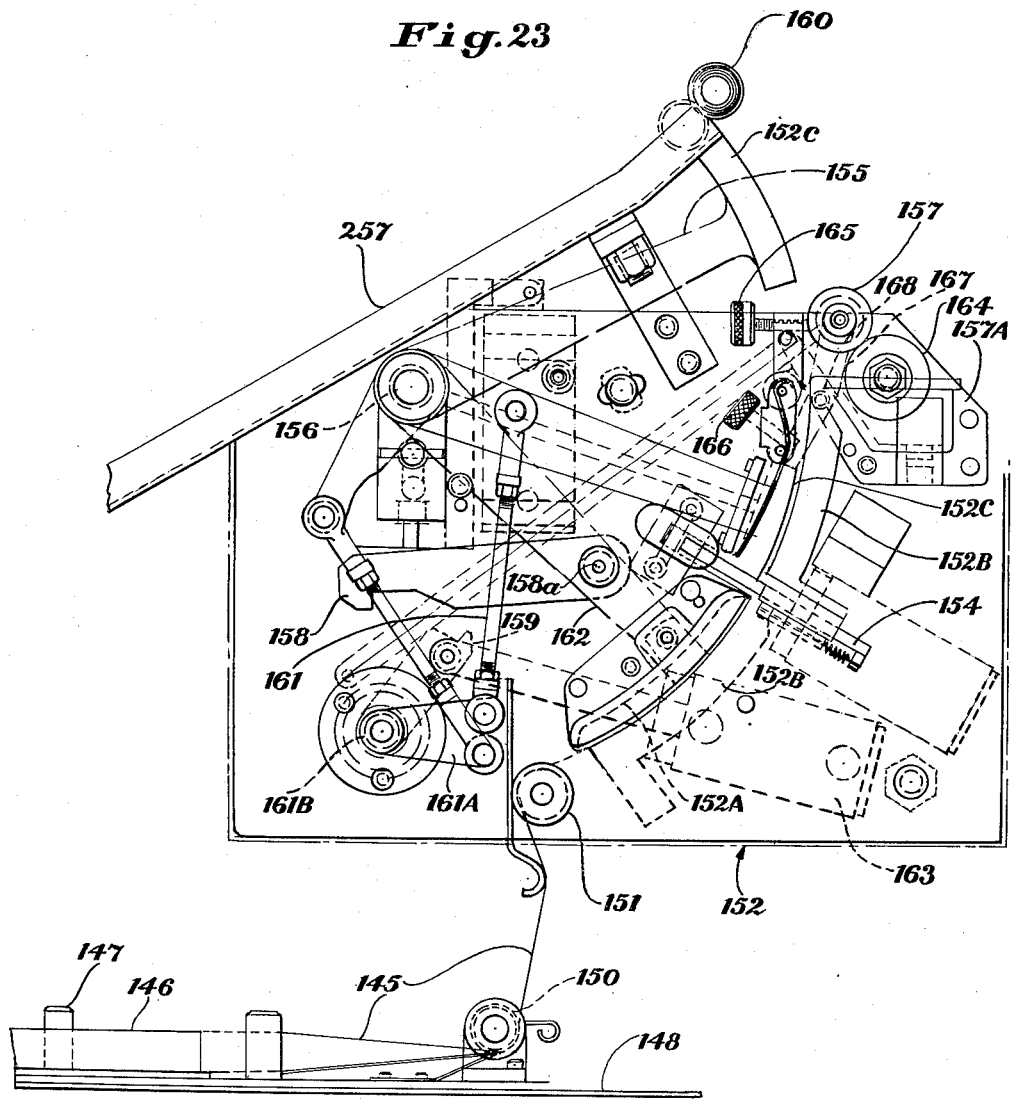

Jan. 1, 1957  E. A. EDWARDS ET AL  2,776,094
AUTOMATIC SPOOLING MACHINE FOR ROLL FILM
Filed Dec. 21, 1953  23 Sheets-Sheet 17
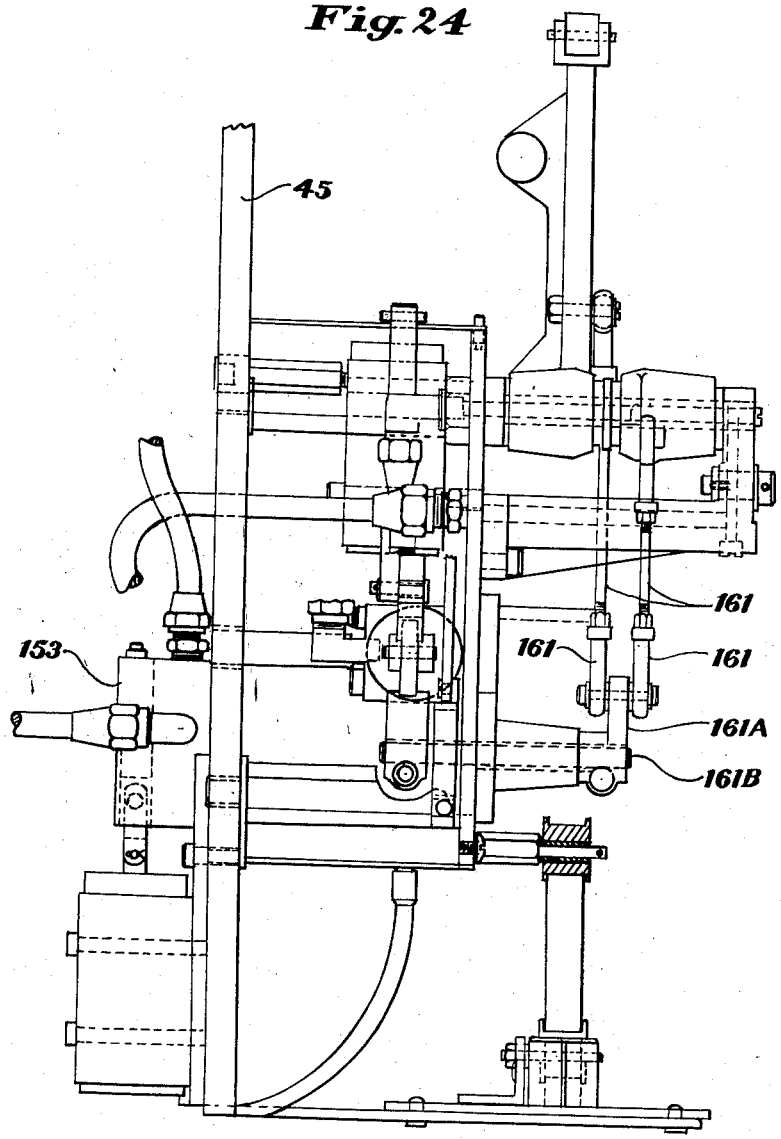
Evan A. Edwards
Clarence R. Wilson
INVENTORS

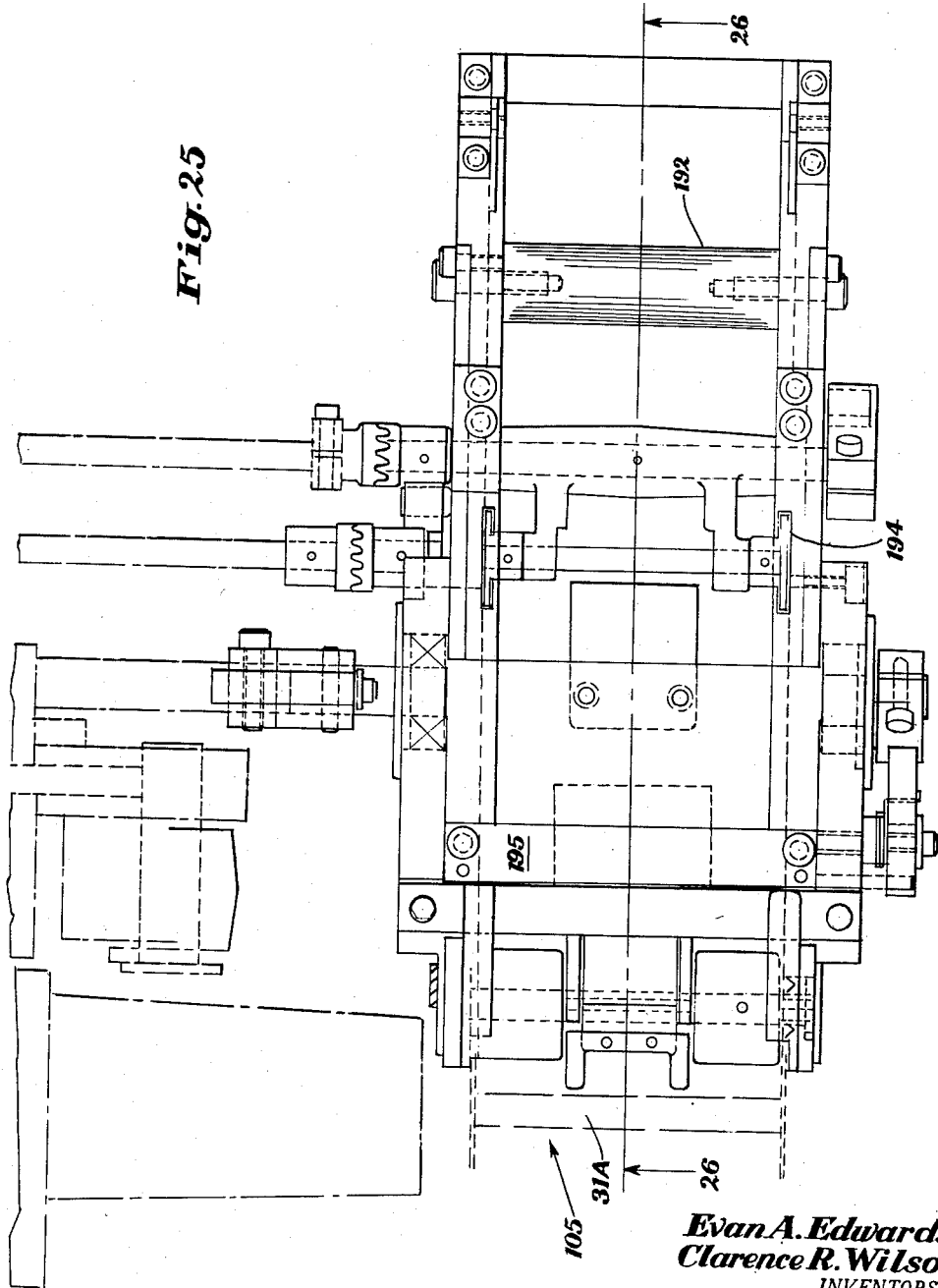

Jan. 1, 1957  E. A. EDWARDS ET AL  2,776,094
AUTOMATIC SPOOLING MACHINE FOR ROLL FILM
Filed Dec. 21, 1953  23 Sheets-Sheet 19
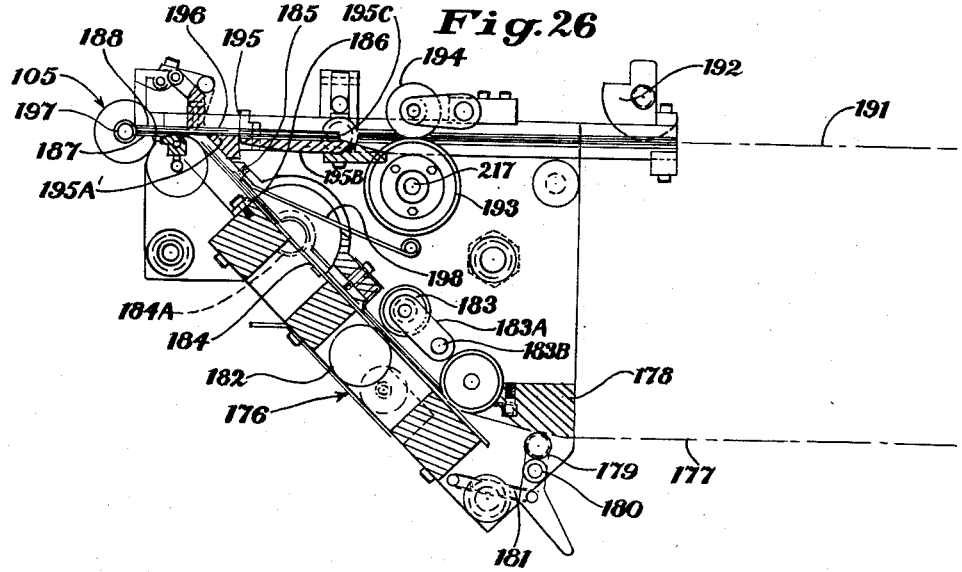
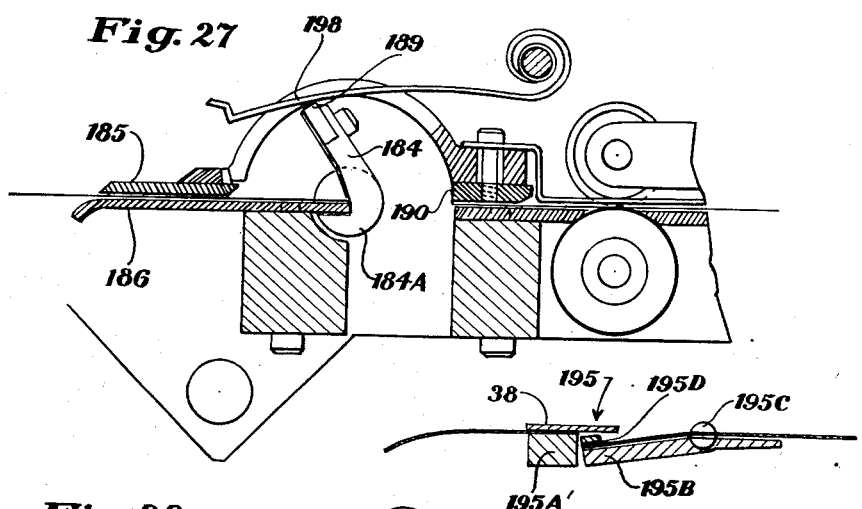
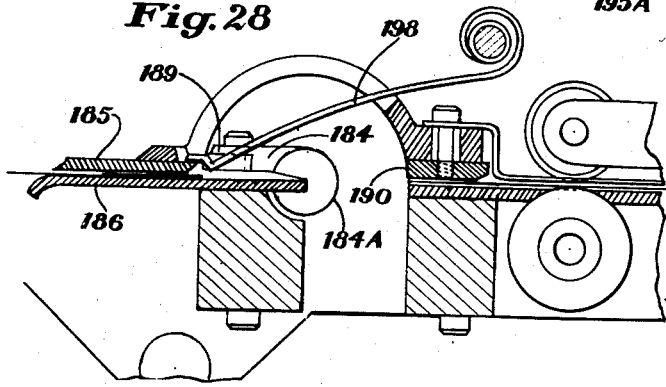
Evan A. Edwards
Clarence R. Wilson
INVENTORS
BY
ATTORNEYS Jan. 1, 1957  E. A. EDWARDS ET AL  2,776,094
AUTOMATIC SPOOLING MACHINE FOR ROLL FILM
Filed Dec. 21, 1953  23 Sheets-Sheet 20
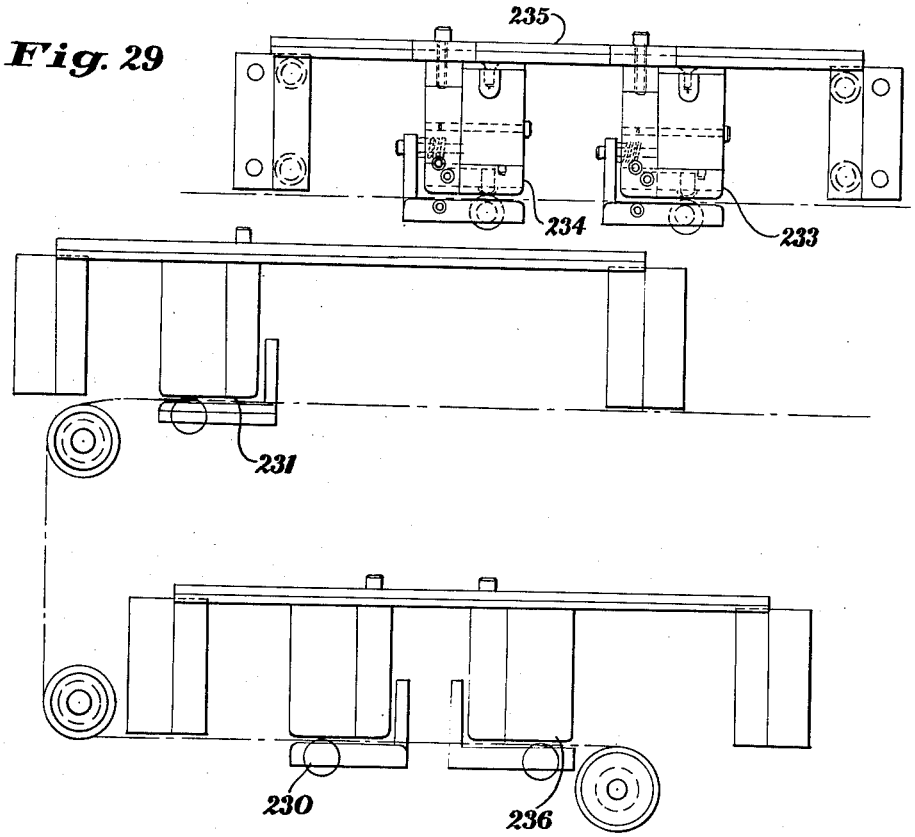
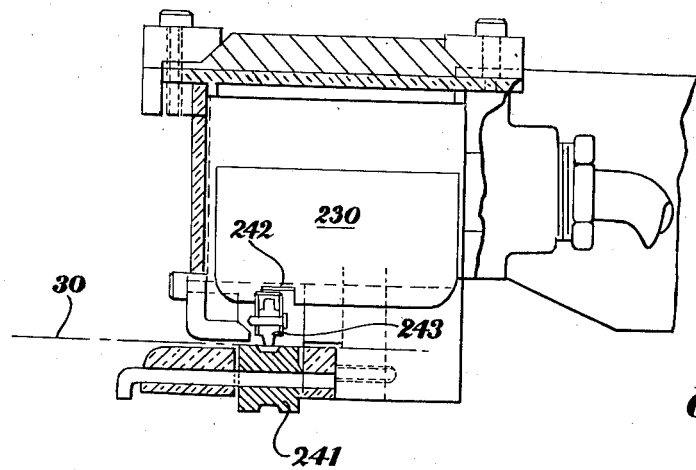
Evan A. Edwards
Clarence R. Wilson
INVENTORS
BY
ATTORNEYS Jan. 1, 1957  E. A. EDWARDS ET AL  2,776,094
AUTOMATIC SPOOLING MACHINE FOR ROLL FILM
Filed Dec. 21, 1953  23 Sheets-Sheet 21

Evan A. Edwards
Clarence R. Wilson
INVENTOR.

BY
ATTORNEYS

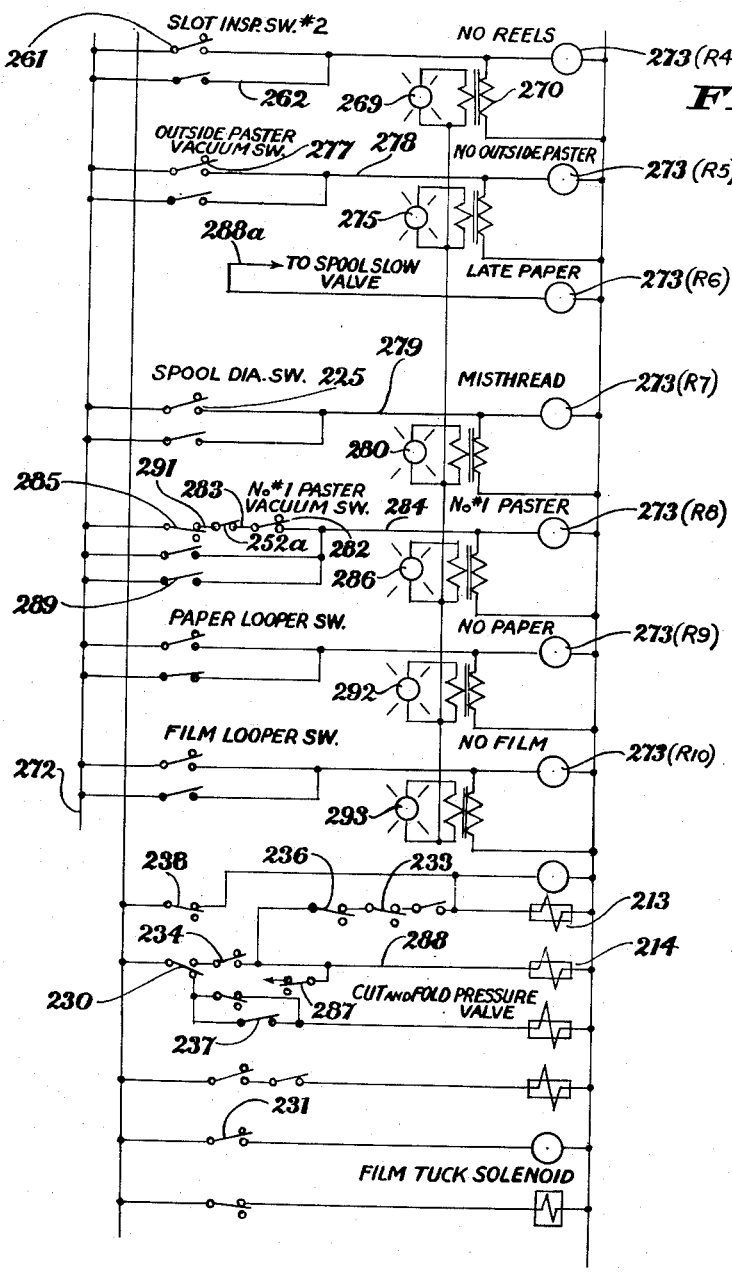

Jan. 1, 1957     E. A. EDWARDS ET AL     2,776,094
AUTOMATIC SPOOLING MACHINE FOR ROLL FILM
Filed Dec. 21, 1953     23 Sheets-Sheet 23

Evan A. Edwards
Clarence R. Wilson
INVENTORS

United States Patent Office 2,776,094
Patented Jan. 1, 1957

2,776,094
AUTOMATIC SPOOLING MACHINE FOR ROLL FILM

Evan A. Edwards and Clarence R. Wilson, Rochester, N. Y., assignors to Eastman Kodak Company, Rochester, N. Y., a corporation of New Jersey Application December 21, 1953, Serial No. 399,554

22 Claims. (Cl. 242—55)

The present invention relates to an improvement in winding machines, and more particularly to a new and improved spooling machine for winding automatically interleaving convolutions of sensitized photographic film and a light-locking or sealing backing paper onto a core of a flanged film reel to provide a cartridge or spool of roll film.

In forming such a spool of roll film, a reel having a central core and spaced end flanges is provided, the core having formed therein an axially extending slot adapted to receive a tapered end or tongue formed on the leading end of the backing paper. After this tongue has been inserted into the core of the reel, a definite amount of backing paper is fed onto the spool, this portion of backing paper being termed the leader portion. After this leader portion has been wound on the spool, a length of film is wound in interleaving relation with the intermediate portion of the backing paper, and finally a trailing portion of backing paper is wound in several convolutions over the sensitized film to provide a protective light-lock therefor, as is well known in the art.

This interleaving winding of the film and backing paper may be performed manually or on semi-automatic machines. However, the various steps involved lend themselves admirably to performance on a fully automatic machine in which the positioning of the reel to receive the backing paper, the measuring of predetermined lengths of both film and backing paper, the timed feeding of the film and backing paper, the interleaving winding of the film and backing paper, and the application of the various stickers are all performed automatically with a minimum of supervision on the part of the operator. With such automatic winding machines, the film and backing paper are supplied from large supply rolls from which the required lengths of films and paper are fed. The roll of backing paper has formed at equally spaced intervals, along its length, notched out areas which provide the well known tapered leading and trailing tongues which are positioned between the trailing end of one strip and the leading end of another strip, as shown in Fig. 1 of the drawings. These notched out areas or sections are used in the machine of the present invention to actuate various controls which will be later more fully described.

The present invention has as its principal object the provision of a new and improved machine for the fully automatic winding of interleaving convolutions of sensitized photographic film and backing paper.

Another object of the invention is the provision of an improved mechanism for positioning the reel and core slot automatically in accurate and proper position to receive the tapered leading end or tongue of the backing paper.

Still another object of the invention is the provision of an improved mechanism for feeding accurately the proper lengths of both film and backing paper, and for then severing the fed lengths of film and paper.

And yet another object of the invention is the provision of a mechanism for feeding the film and backing paper in proper timed relation.

And another object of the invention is the provision of mechanisms for feeding and applying stickers or pasters to appropriate parts of the film roll.

A further object of the invention is the provision of a mechanism for folding over automatically the tapered trailing end of the backing paper.

And a further object of the invention is the provision of various controls which will prevent improper or incomplete winding of the film and paper.

Yet a further object of the invention is the provision of a machine of the class described which is smaller and less expensive than prior machines of this class, easier to adjust and maintain, has a higher quality level and performs several additional features not possible with prior machines.

To these and other ends, the inventive idea resides in certain improvements and combinations of parts, all as will be hereinafter more fully described, the novel features being pointed out in the claims at the end of the specification.

In the drawings:

Fig. 1 is a fragmentary view of a portion of the backing paper web showing one of the notches therein which form the leading and trailing tongues, and which provide the notch by which the various control switches are actuated;

Fig. 2 is a view of the assembled film and backing paper, in open or unwound relations, showing their relative positions and the relation to the film reel;

Fig. 3 is a perspective view of the front of the machine with the film and paper compartment open, showing the relation of the parts;

Fig. 13 is a plan view of the mechanism illustrated in Fig. 11;

Fig. 14 is a side view of a portion of the machine illustrated in Fig. 11 with the frame in section, showing the rockable reel feeding and positioning member;

Fig. 16 is a rear elevation view of the winding station showing the relation of the various parts;

Fig. 17 is a vertical sectional view through the winding spindle and associated parts, and taken substantially on line 17—17 of Fig. 16;

Fig. 18 is a right end view of the mechanism illustrated in Fig. 17;

Fig. 19 is a left end elevation view of a portion of the mechanism illustrated in Fig. 3 with parts removed for the purpose of clarity, showing the various spool receiving compartments and the movable directing members therefor;

Fig. 20 is a front elevation view of the #1 paster mechanism with parts in starting position;

Fig. 21 is a view similar to Fig. 20 but with the paster advanced ready for cut off;

Fig. 22 is a vertical sectional view through the #1 paster mechanism and taken substantially on line 22—22 of Fig. 21, showing the various vacuum boxes and their relation to the cutting and applying members;

Fig. 23 is a side elevation view of the outside paster applying mechanism, showing the relation of the various parts;

Fig. 24 is a left end view of the mechanism illustrated in Fig. 23 showing the mechanism for connecting the applicator arms;

Fig. 25 is a plan view of the film and paper threader;

Fig. 26 is a vertical sectional view through the threader illustrated in Fig. 25 and taken substantially on line 26—26 of the latter, showing the various parts and with the knife in its initial or inoperative position;

Fig. 26a is a partial sectional view through the film severing means, showing the relation of the parts after the cutting operation to move the cut parts out of a plane.

Fig. 27 is a partial sectional view of the mechanism illustrated in Fig. 26, but showing the paper knife mounted to fold the trailing tongue of the backing paper strip;

Fig. 28 is a view similar to Fig. 27, but showing the paper knife at the end of the folding operation;

Fig. 29 is a diagrammatic view of the relation of the various switches to control the mechanisms;

Fig. 30 is a vertical sectional view through one of the switches illustrated in Fig. 29, showing the relation of the various switch parts;

Figs. 31 and 31a represent the wiring diagram of the various controls and inspection devices.

Similar reference numerals throughout the various views indicate the same parts.

Figure 4:
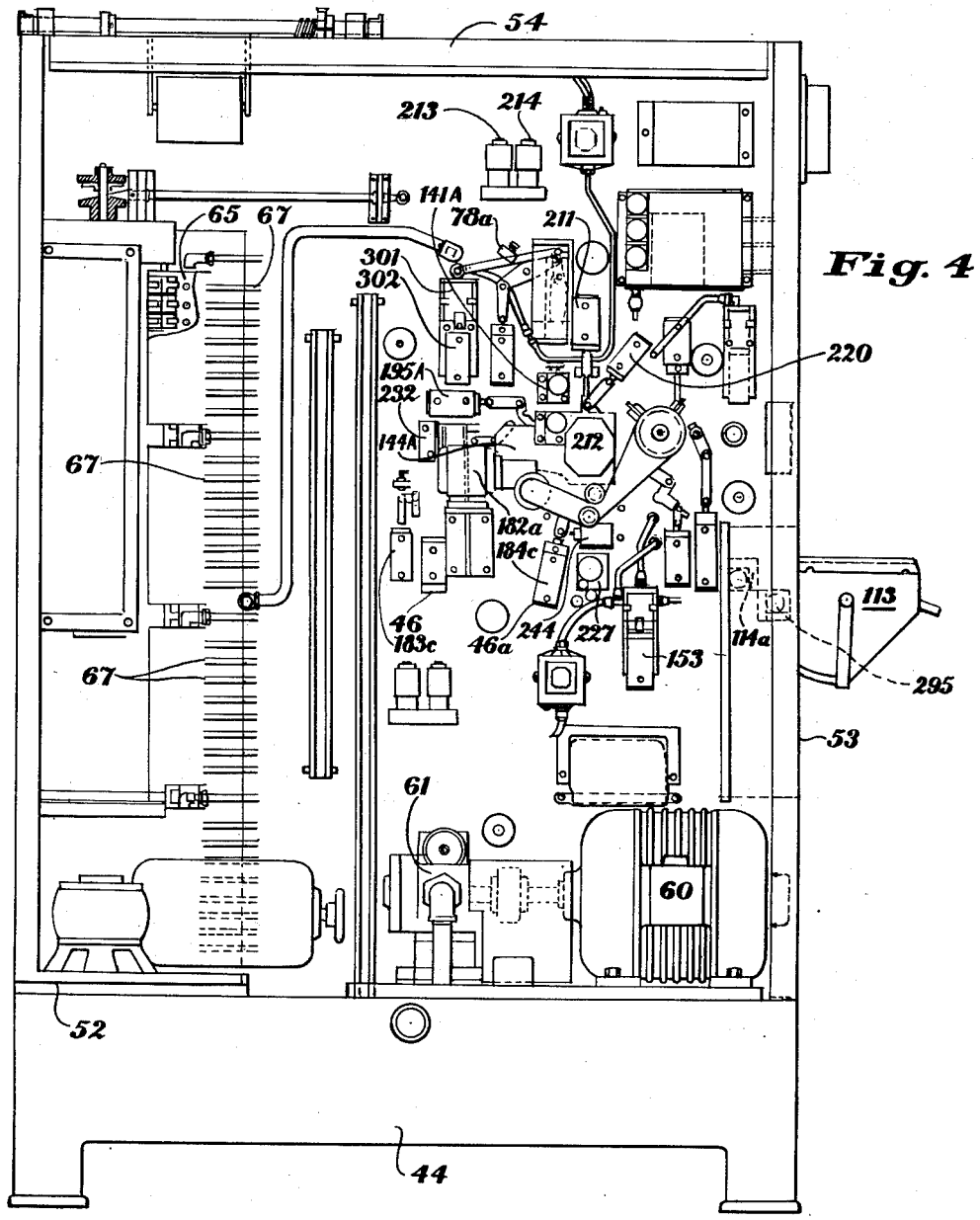
Fig. 4 is a back elevation view of the machine showing the various control mechanisms.

The general purpose of the machine of the present invention is the automatic winding of a length of backing paper 30 and a shorter length of sensitized film 31 onto a film reel, which may be of any suitable material, such as plastic or metal, and generally indicated by the numeral 31a. The reel is formed with a core 32 and end flanges 33, all as shown in Fig. 2 to form, with the backing paper and film, what is known in the art as a spool of roll film.

The core 32 is provided with a slot 34 adapted to receive the tapered end or tongue 35 of the leading end 36 of the strip of backing paper 30. As is well known, this leading end is wound in overlying convolutions on the reel core 32. The strip of film 31 is spaced from the leading end 36 and lies on the intermediate portion of the backing paper 30, as shown in Fig. 2, and has a trailing edge 37 connected to the backing paper by means of a sticker or paster 38, hereinafter called #1 paster. When the film 31 and backing paper 30 are wound in interleaving convolutions, several additional convolutions of backing paper in the form of a trailing end 39 are wound to overly the sensitized film 31 to provide a protective light-locking covering therefor, as is well known in the art. The trailing end 39 of the paper terminates in a tapered portion or tongue 40 similar to tongue 35. As shown in Fig. 1, the tapered tongues 35 and 40 are connected in the strip of backing paper, and form a notch 43 which is used to actuate various switches, as will be hereinafter described. A paster 41, hereinafter called the outside paster, is connected to the tongue 40 and serves to connect or adhesively joint the outer convolutions of the backing paper of the wound roll to retain the roll in its wound condition, all of which is deemed apparent. If desired, the backing paper also may be provided with an additional paster 42 positioned near the tongue 35. This latter paster is used to engage adjacent outer convolutions of the backing paper of the exposed roll to hold or seal the exposed roll of film in its wound condition and in light-tight relation, the advantages of which are deemed apparent. The strip of backing paper is supplied to the machine from a supply roll, to be later described, in which adjacent strips or sections 30 of the individual spools are connected as shown in Fig. 1. The adjacent strips which form the finished film spools are severed from the web of backing paper along line 33a by severing means to be later described.

Figure 7:
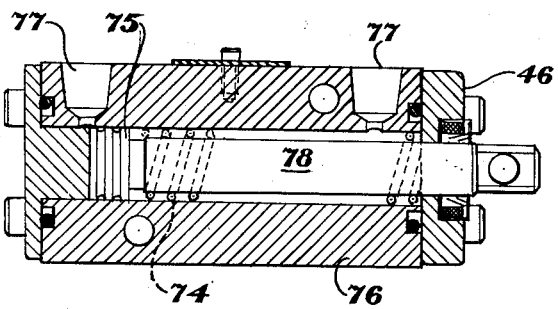
Fig. 7 is a longitudinal sectional view through one of the hydraulic cylinders.
Figure 8:
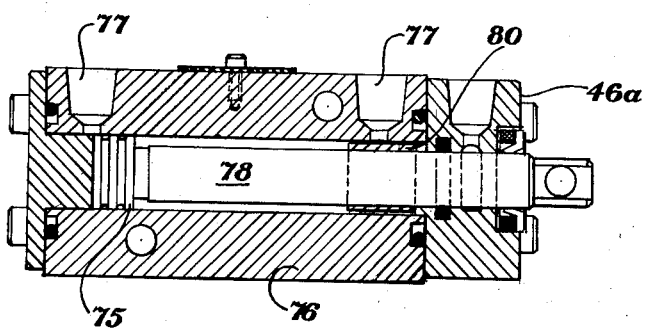
Fig. 8 is a view similar to Fig. 7 but through another form of hydraulic cylinder.

The machine of the present invention is a cam-timed, hydraulically actuated machine provided with electric interlocks and automatic stops. The machine is constructed with an oil sump tank 44 as the base of a front panel 45 which is ½ inch thick, see Fig. 3. The hydraulic cylinders, generally indicated by the numerals 46 and 46a, see Figs. 7 and 8, are mounted on the rear of the panel 45 while rollers 47, choppers 48, and other parts for handling the paper strip 30 and the film strip 31, the reels 31a and the pasters 38 and 41, are mounted on the front face 49, of the panel 45. The cam units 50, see Fig. 5, with their vertical shafts 51, serve as a left back end 52, while a single panel 53 Fig. 4 serves as a right side frame, and a sheet metal top 54 and double doors, not shown, form the back of the machine and enclose the bulk of the operating control mechanisms, yet permit ready accessibility for adjustment and maintenance. The machine embodies several mechanisms each of which performs a definite function, but which is actuated and controlled in timed relation and cooperates with other mechanisms to secure the final result, namely, a properly wound roll of interleaving paper and film to provide a wound film roll. To facilitate easy understanding of the various mechanisms they will be discussed and described under separate headings.

*Hydraulic system*

Figure 9:
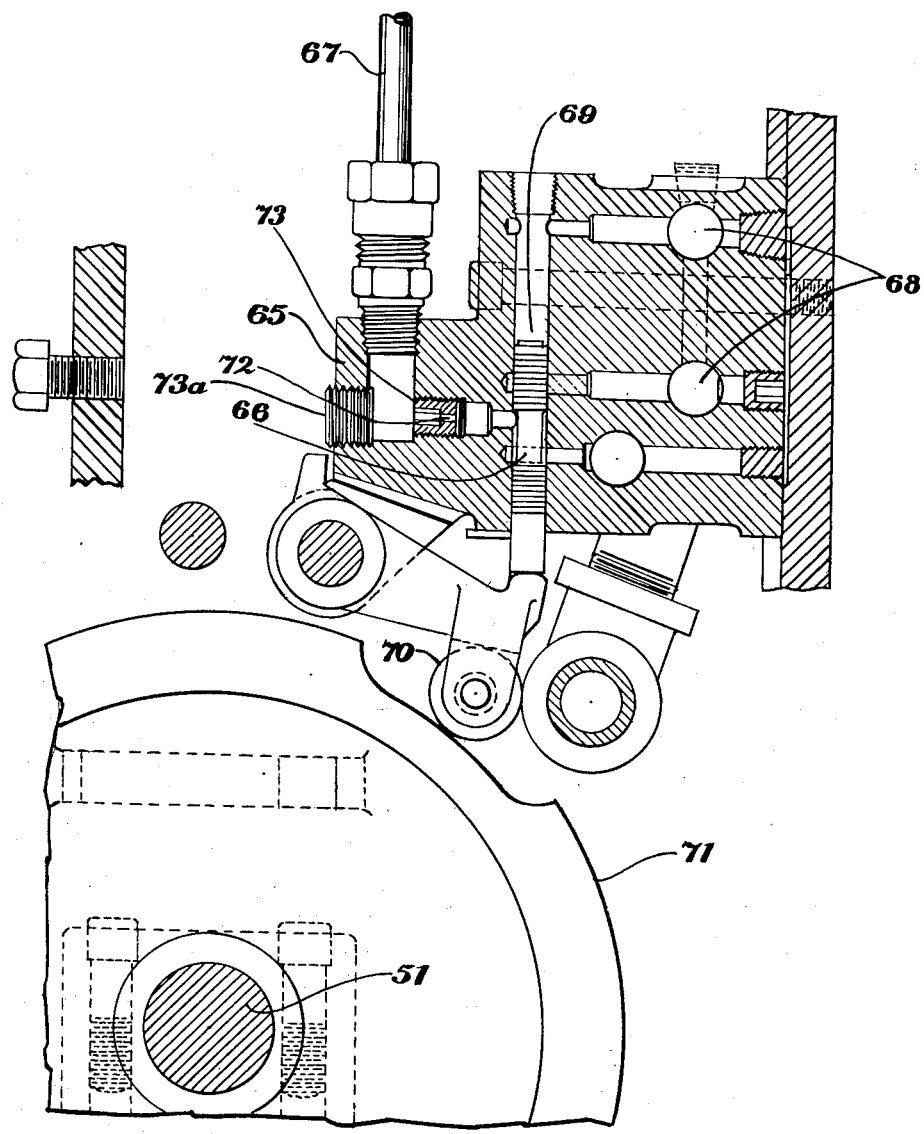
Fig. 9 is a vertical sectional view through one of the control valves and taken substantially on line 9—9 of Fig. 15.
Figure 15:
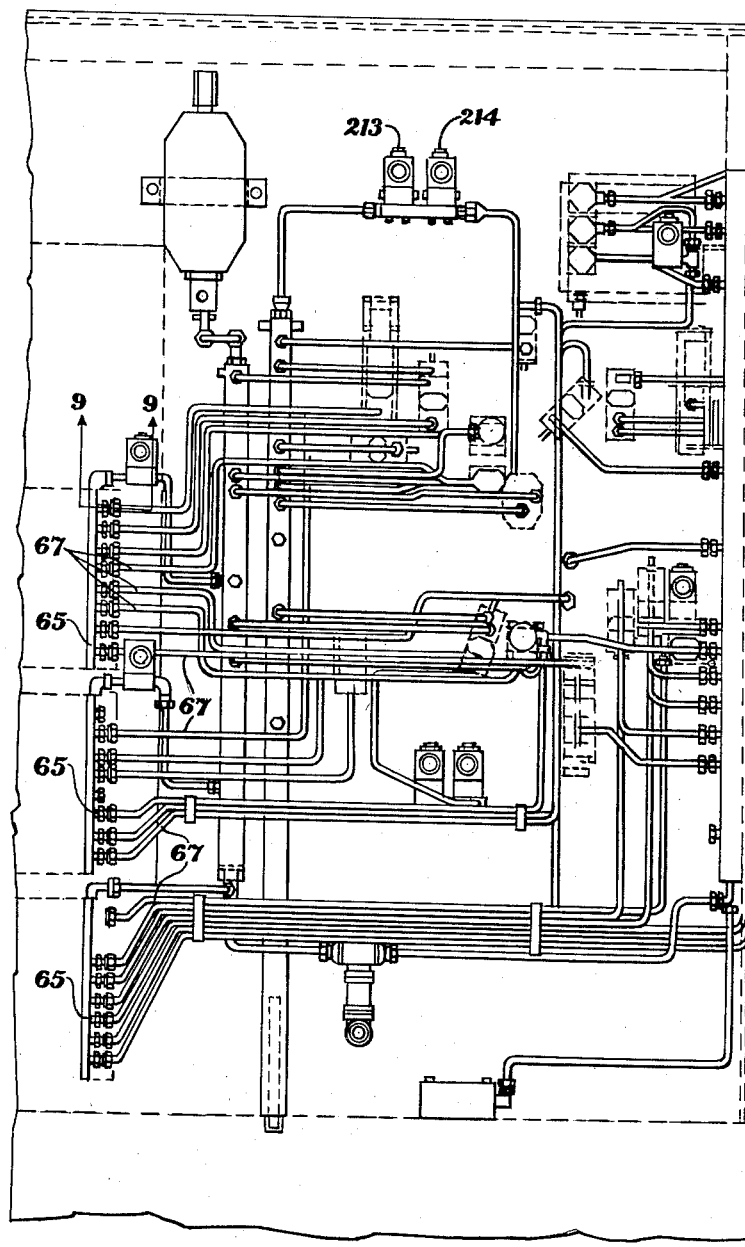
Fig. 15 is a rear view of the machine showing the various oil manifold sections and the oil pressure lines.

A 2 H. P. motor 60, Fig. 4, drives a Vickers pump 61 to provide a 4.5 G. P. M. supply of hydraulic oil at 300 p. s. i. The sump tank 44, see Fig. 6, houses a cooling coil 62 and thermostat 63, and electric heater strips 63a to maintain the oil temperature at approximately 110° F. whether the pump 61 is running or not. Also a filter 63b may be provided. The oil under pressure is piped to manifold 65, Figs. 9 and 15, where the cam control valves 66, Fig 9, either connect the pressure to the individual cylinders 46 or 46a through pipes 67, or connect the cylinders through a return line 68 to the sump 44. These valves 66 are known as 3-way valves. The valve plungers 69, Fig. 9, are urged against the cam followers 70 which, in turn, are urged against the individual cams 71 by oil pressure applied to the back end of the plungers 69. This arrangement reduces the pressure of the springs which when used alone might wear, break, score the cylinder walls or otherwise cause trouble. Each individual cam 71 is mounted on shaft 51 and constitute a cam unit 50, see Fig. 5. There is space in the machine for four manifolds 65 containing eight valves 66 each, but only three of these manifolds are used in the present machine. Each valve 66 and its cam 71 is associated with a particular cylinder and function. The rate at which the cylinder moves is controlled by a restriction 72 in the form of a drilled hole in a ⅛ inch plug 73. These restrictions have different size holes depending upon the function performed, and can be changed without disturbing the piping by merely removing a plug 73a. The cylinders 46 and 46a are of two types, see Figs. 7 and 8. For short stroke applications the cylinder 46, Fig. 7, is used, which has cylinder return spring 74 which serves to return the piston 75, to the left when pressure from the valve is removed, as is deemed apparent from an inspection of Fig. 7. For a longer stroke application, the cylinder construction 46a, Fig. 8 is used. For such longer strokes the space required for spring 74 becomes too great so that the same cylinder body 76 is used, but with a pressure giving a stroke of 1½ inch. With this longer stroke arrangement, when the piston is to be moved to the left, pressure is applied only through the right hand oil inlet 77 and the pressure acts on the right side of the piston to move the latter to the left. For return movement of the piston, pressure is applied through both inlets 77 to both sides of the piston, and due to the effective exposed areas of the piston, and the rod 78, the pressure on the left side of the piston is sufficient to move the piston to the right thereby giving the return movement. Most of the cylinders 46a are limited in their stroke by stops 78a or 80, see Figs. 4 and 8 respectively.

The expected normal leakage of oil passed the manifold valve plungers serves to lubricate the cams and cam followers, and the excess oil drains back into the sump 44 at the bottom of the cam units 50. Oil spilled from the pipes in the rear of the machine during disassembly or accidental leakage is kept on top of the base until it drains back into the sump.

Reel feed

Figure 10:
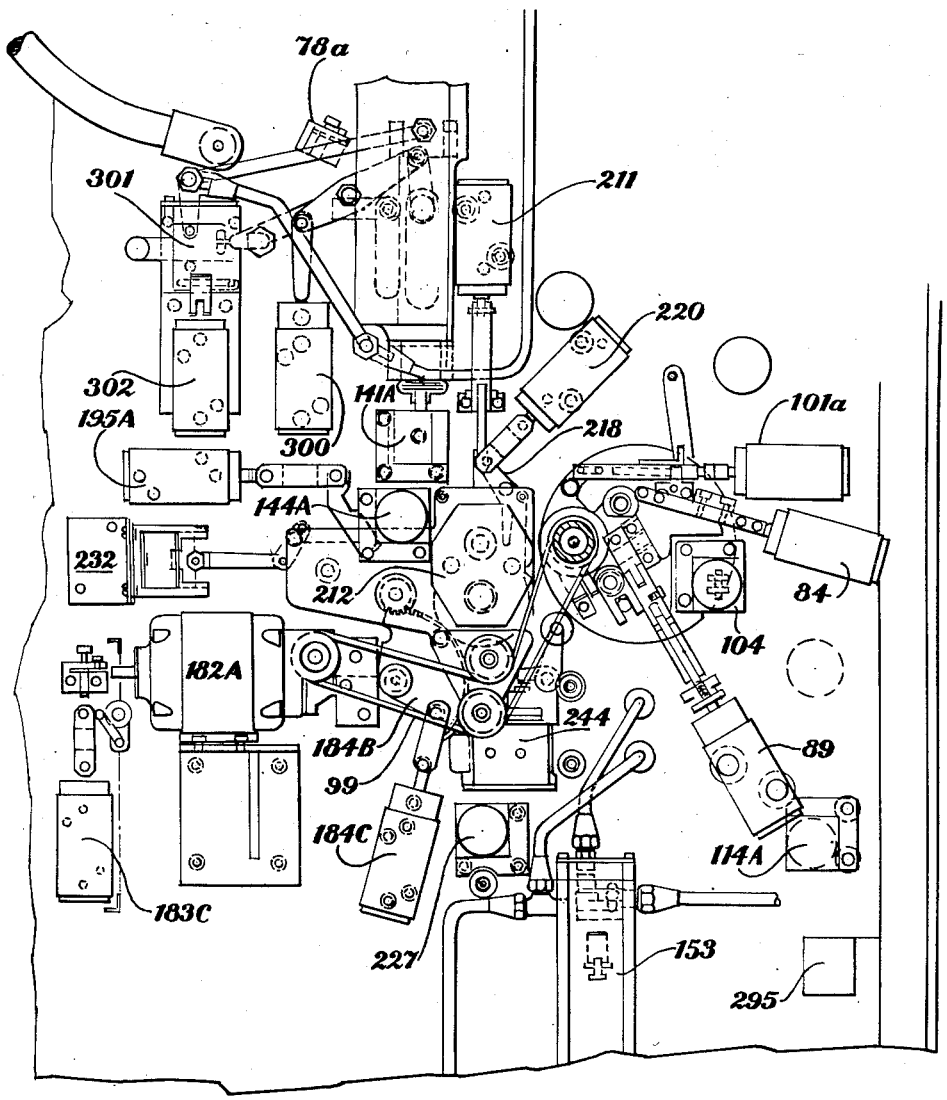
Fig. 10 is a partial rear view of the machine showing the control cylinders and solenoids.
Figure 11:
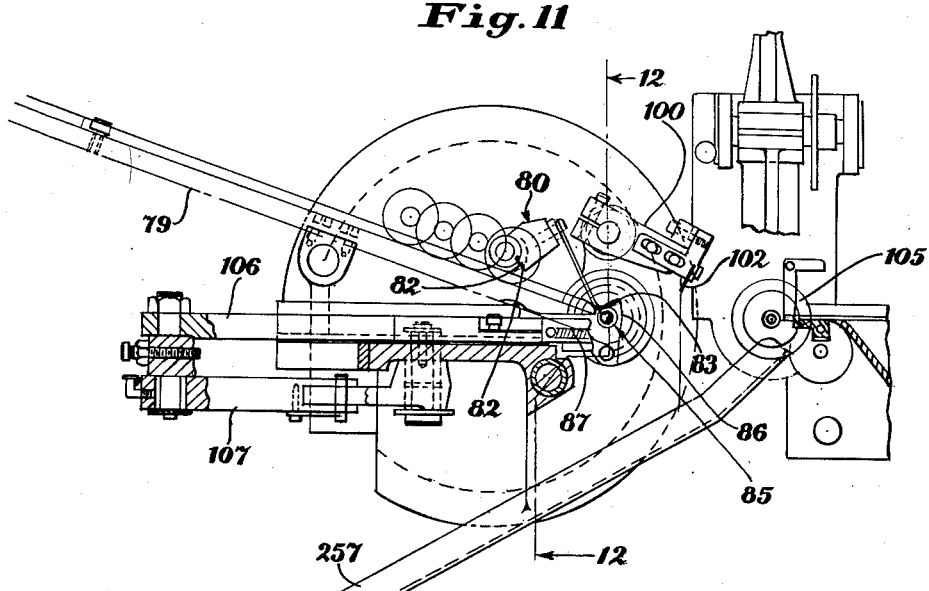
Fig. 11 is a partial front elevation view of the machine, showing the relation of the reel transfer and winding stations.

The reels 31a are fed from a source of supply, not shown, down an inclined ramp or track 79, see Figs. 3 and 11, to the transfer station. A U-shaped member 80, Figs. 11 and 14, is carried by a rockable shaft 81, and, when in the position shown in Fig. 11, has a pair of spaced arms 82 which engage the lowermost spool on track 79 to retain a group of spools in position on the track. The member 80 also carries a forwardly extending spring 83 of the shape best shown in Fig. 11. When a spool is to be fed, cylinder 84, Fig. 10, is actuated to rock shaft 81 counterclockwise, as viewed in Fig. 11 to lift spring 83 and rock arms 82 out of holding relation with the lowermost spool 31a, so that the latter rolls freely downward to the transfer station 85, Fig. 11. When the reel has reached the transfer station, the shaft 81 is then rocked in the opposite direction to return the parts to the position illustrated in Fig. 11 where arms 82 engage the lowermost reel 31a on track 79 to hold the supply of spools thereon. Simultaneously, the lower end of spring 83 engages the reel at the transfer station 85 and pushes the reel down behind a pair of fingers 86 which are urged to the left by means of spring 87, Fig. 11. Engagement of the spool behind fingers 86 positions the spool in axial alignment with axially movable centers 88, the latter being spaced to permit the spool to be positioned therebetween and at the transfer station. Thereupon, cylinder 89 is actuated to move arm 90. The upper end of arm 90 has connected thereto an arm 92 the free end of which carries a gear 93 which engages a pair of racks 94 which are connected to supports 95 on which the centers 88 are carried. It is deemed to be apparent from an inspection of Fig. 12 that when arm 92 is moved in one direction, the gear 93 will engage the racks 94 to move the supports or carriages 95 in a direction to separate the centers 88, but when arm 92 is moved in the opposite direction, the gear 93 and the rack 94 will be moved to adjust the carriages 95 to bring the centers 88 toward each other and into gripping relation with the positioned film reel 31a.

Figure 12:
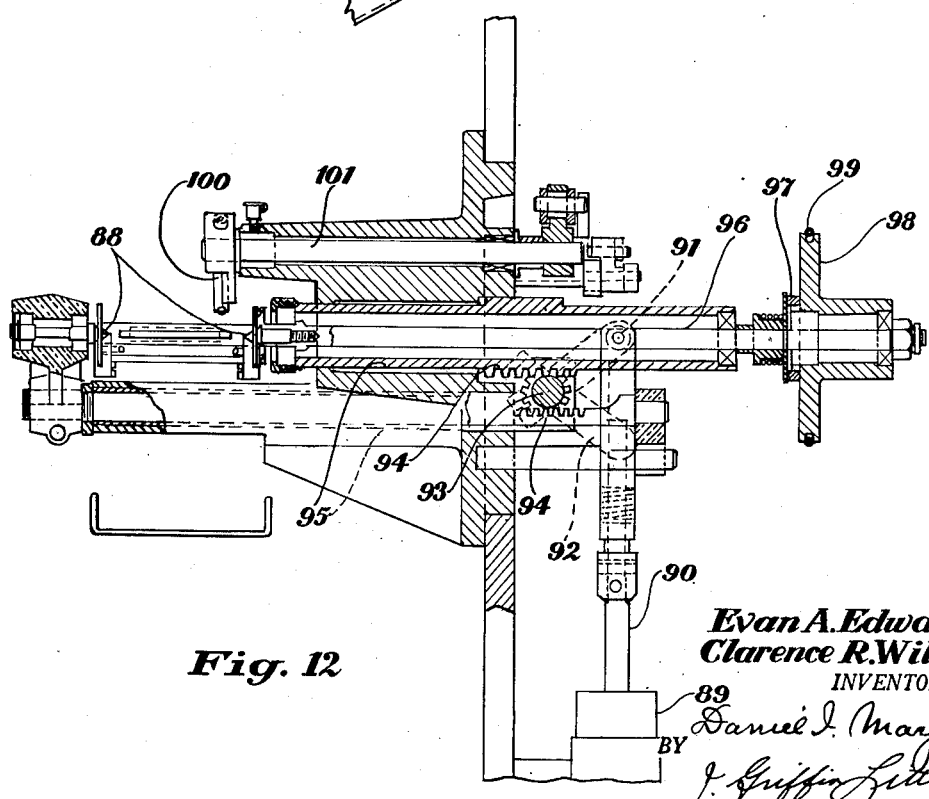
Fig. 12 is a vertical sectional view through the machine illustrated in Fig. 11 and taken substantially on line 12—12 of the latter.
Figure 31:
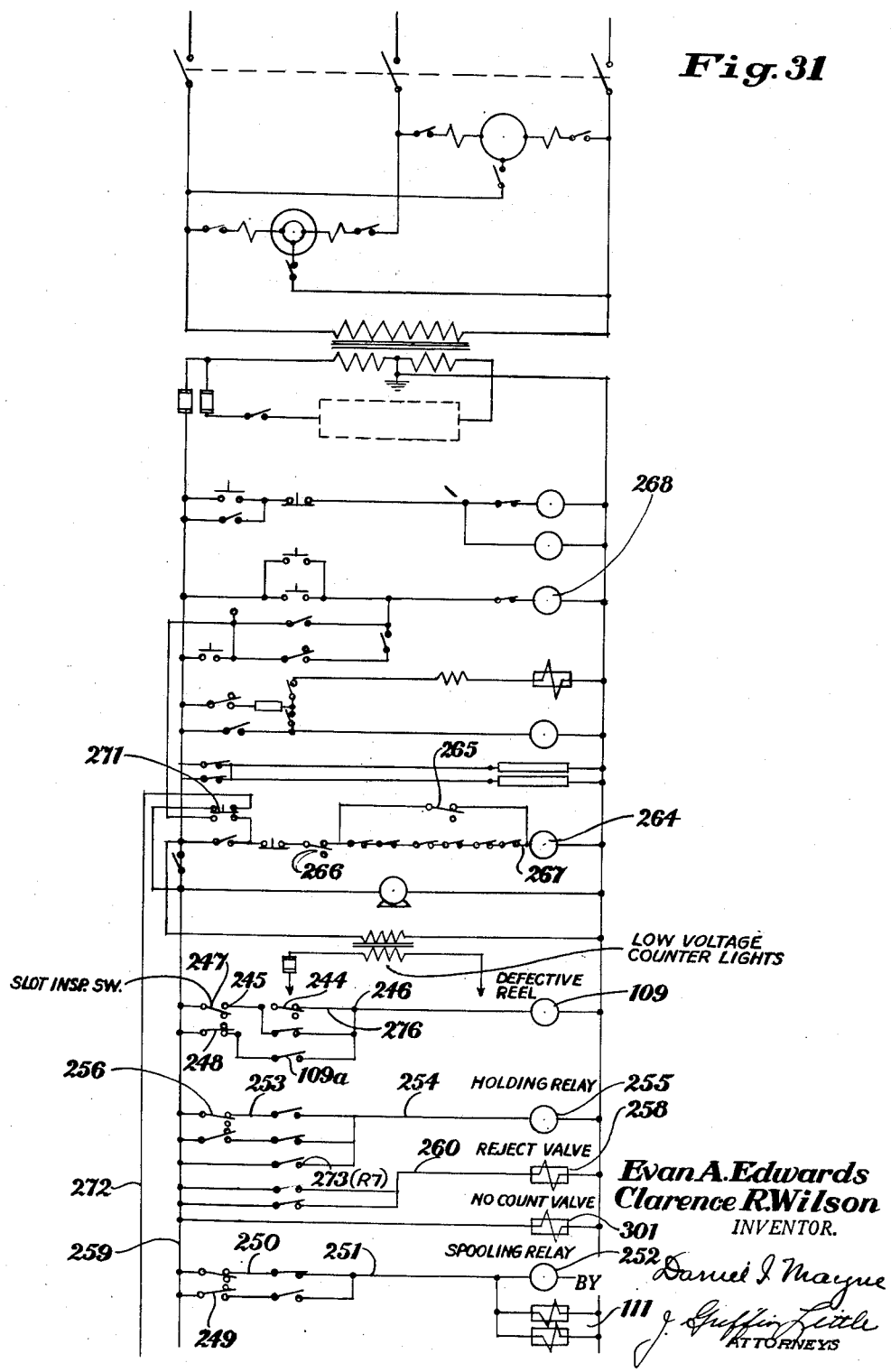

When the reel is positioned at the transfer station 85, cylinder 89 is actuated to move the centers in spool-engaging position. The right center, as viewed in Fig. 12, is carried by a shaft 96 which is connected through a slip clutch 97 to a pulley 98 driven by a belt 99 from a motor 182a, Fig. 10. This structure provides a light friction drive which rotates the reel slowly. A cantilever arm 100, Figs. 11 and 12, is carried by shaft 101 and has positioned on the free end thereof a blade 102, Fig. 11, adapted to be moved into the slot 34 of the reel core 32 to position or orient the reel with the slot 34 horizontal. To secure such orientation, a cylinder 101a, Fig. 10, is actuated to rock shaft 101 to move the arm 100 clockwise, as viewed in Fig. 11 to bring blade 102 into engagement with the reel core. When the spool has been rotated sufficiently to bring the slot 34 into registry with the blade 102, the latter moves into the slot to stall or stop the rotation of the reel to orient the latter with the slot 34 horizontally, the clutch 97 slipping. If blade 102 fails to enter the slot 34 switch 244, Fig. 31, is not opened, and when timing switch 247, Fig. 31, on 50, Fig. 5, closes relay 109, Fig. 31, is engaged and held closed by 109a. Thus, the reel has been moved into position at the transfer station 85, and has been orientated with slot 34 in horizontal position. Thereupon the centers 88 open to release the oriented reel. After the reel has been thus oriented and the centers 88 opened, a cylinder 104, Fig. 10, is actuated to shift the oriented spool from the transfer station 85 to the winding station 105, Fig. 11. To secure this result, the oriented spool at the transfer station 85 is carried on a reciprocating slide or carriage 106, Figs. 11 and 13, which is connected through a linkage 107 to the cylinder 104. The result is that by actuation of the cylinder 104, the linkage 107 shifts carriage 106 to the right, as viewed in Figs. 11 and 13, to move the oriented spool from the transfer station 85 to the winding station 105, as is deemed apparent from an inspection of Fig. 11. The spring actuated fingers 86 serves to retain the orientation of the reel 31a during its movement from the transfer station 85 to the winding station 105. When the spool arrives at the winding station, it is gripped in winding position in a manner to be later described. Then, the carriage 106 is returned to the left to receive another spool at the receiving station, the spring pressed fingers 86 moving to permit the fingers to slide over the spool at the winding station.

The normally closed microswitch 244, Figs. 10 and 31, labeled "Slot inspection switch 1" must be opened by insertion of the blade 102 completely within slot 34 in order that spooling will take place when the oriented reel is transferred to the winding station 105, as above described. At the end of the cycle, spool relay 252 Fig. 31 becomes de-energized as well as solenoids 111, Fig. 31 controlling the flow of pressure oil to the upper two manifold sections 65, Fig. 15. These upper manifolds have eight valves each and control the turning and winding spindle, threading the paper, and the feeding of the pasters. The effect of this arrangement is that if a defective roll is put in the winding spindle 197, the spindle never turns, nor is any film, paper or pasters fed to it. If the following reel is good, the pressure oil is turned on again and the beginning of the cycle and the spooling takes place as usual without any stopping of the machine or attention from the operator. A further effect of this circuit is that a defective reel is placed in the reject hopper 113, Fig. 19. This is accomplished by automatic opening of the trap door 114 by means of cylinder 114a, Fig. 10 to connect the delivery chute 257 to hopper 113 at the proper time in the cycle.

Paper feed

The backing paper 30 is supplied from a stock roll 115 which is placed on an arbor 116 as clearly illustrated in Fig. 3. The paper passes under the guide shoe 117 to take out any lateral variation in position that may be in the stock roll 115.

The paper web 30 then passes over a 3-roll looper arm 118 which controls the tension under which the paper is wound onto the reel. As the paper is pulled away by the machine, the loop arm raises and releases a multi-shoe block brake 119 to permit the stock roll 115 to turn freely and feed out more paper. The downward force of the rollers 120 on arm 118 which force is partly the weight of the arm and partly the result of spring force by spring 121, determines the tension on the paper web or strip. As the machine stops taking paper away from the looper, the looper arm 118 drops, and a brake is applied with a fixed torque determined by braking spring 121. As the stock roll 115 rotates, a portion of a revolution while coming to rest, the paper feeds out and drops the looper arm 118 and additional amount which it can do by means of the vertical slot 122 in the braking arm 123, and still keep tension on the paper. The brake release point is about one-third of the looper arm travel up from the bottom. An auxiliary link, not shown, has been incorporated to put a small amount of drag on the paper when the paper roll expires, dropping the looper arm 118 to the bottom. Also, at the bottom position of the looper arm a microswitch 124 is actuated to stop spool operation at the end of the cycle.

*Film feeding*

The film is carried by a supply roll 130 positioned on the stock roll arbor 131. The film web 31 is threaded over three fixed rollers 132 and also the rollers 133 on the looper arm 134, which serves along, with brake 135 and arbor 131, to maintain and control tension on the film. A switch 136 is actuated by the film loop arm 134 to stop the machine at the end of a cycle when the film roll 130 is exhausted. The film stock roll 130 and arm 134 are enclosed in a light-tight film cabinet 177 having an upward swing cover, not shown, which must be closed in order to run the machine.

*No. 1 paster feed*

Figure 32:
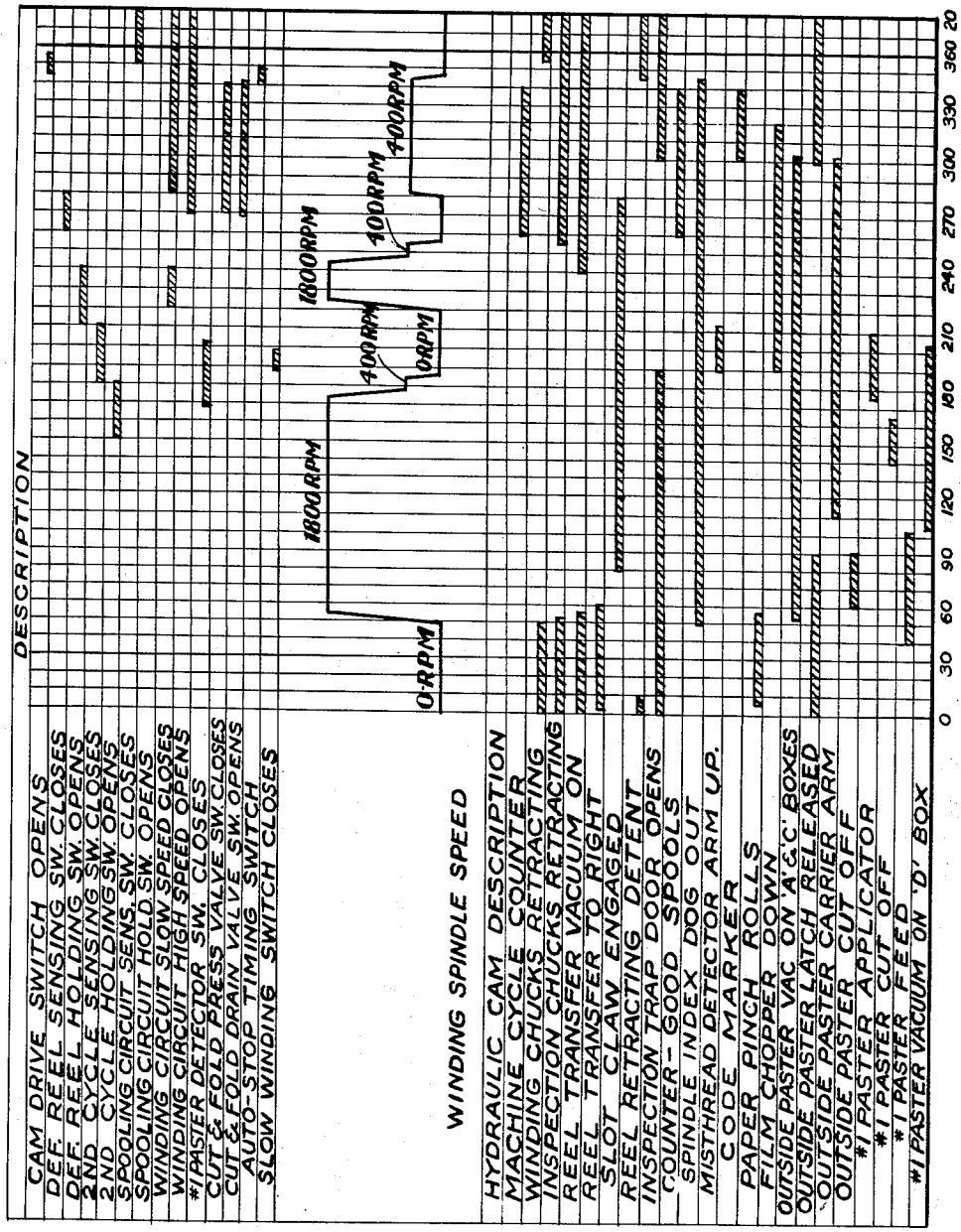
Fig. 32 is a cam timing-chart for the machine.

The pressure-adhesive #1 paster stock roll 138 is placed on an expanding arbor 139 near the top of the machine, as shown in Figs. 3 and 20, and supplies the #1 paster to the #1 paster unit, broadly designated by the numeral 140 in Fig. 3, and shown in more detail in Figures 20, 21, and 22. The paster is handled entirely by vacuum and is touched on the front or sticky side only by the cut-off knife 141. The various sections of the vacuum boxed are lettered 142A, B, C, D. At rest, the vacuum is on box 142B, and the bottom end of the paster strip 143 is at the cut off knife 141. At 40° of the cycle, as shown in timing chart Fig. 32, the #1 paster feed starts to feed, and the box 142B moves down until its linkage strikes an adjustable stop 78a Fig. 10 which permits adjustment of the length of the #1 paster. The box 142B is moved by a cylinder 300, Fig. 10, and while the box 142B is still down, a vacuum valve 301 operated by cylinder 302 operating at 94°, see Figs. 4 and 10, turns the vacuum off box 143B and turns vacuum on 142A, C and D. Thus, with the paster is held down on both sides of the knife 141, the latter being operated at 140° by cylinder 141A, Figs. 10 and 22, and returns at 164°, as shown in chart, Fig. 32, to sever the #1 paster from the strip. The box 142D is in the form of an applicator arm pivoted at 144 and actuated by cylinder 144A. The box 142D starts to pivot counterclockwise, see Fig. 22, at 175° to apply the #1 paster 38 to the trailing end 37 of the film strip 31 to connect the latter to the backing paper, as shown in Fig. 2 and to be later more fully described. When the box 143B is down, the vacuum is turned off 142A, C, and D, releasing the paster 38 from the applicator 142D. In the meantime, the box 142B has been returned to its upper position before the change in vacuum, so that the paster strip 143 and the box 143B are in position for the next feeding cycle, as shown in Figs. 20 and 22.

*Outside paster feed*

The outside paster 41 is formed from a strip 145 of paper wound on the stock roll 146 which is laid on its side over the stud 147 on top 148 of the paper cabinet 149, as shown in Figs. 3 and 23. The paper strip 145 is twisted 90°, passed over a roller 150 and over another roller 151 and into the outside paster unit broadly designated by the numeral 152. The paster strip 145 is fed by vacuum to boxes 152A, B and C. The strip 145 is picked up by box 152A and is held in the position shown in Fig. 23 when the machine is at rest. At 53° on the cam shaft 51, see Fig. 32, the vacuum valve 153, Figs. 4 and 10, shifts and pulls the strip 145 from box 152B over against the boxes 152A and C. While the strip is so held, the cut-off knife 154 is actuated at 60° and returns at 90°, the lower end of strip 145 is then held by box 152A. At 110° the applicator arm 155 which carries box 152C and is pivoted at 156, moves the box 152C up and carries the severed strip 41 glue side out past a rubber moistening roll 157. This applies water onto the severed paster 41 from end to end. The arm 155 moves to a point just beyond the moistening roll 157 but not to the top of its travel, and is held by a latch 158 which is pivoted and 158A and which engages a member 159 during the mid-portion of the machine cycle permitting the glue to soften. At 299° on the cam shaft, the latch 158 is released allowing the applicator 152C to come up against the outside of the wound spool 160 at the winding station 105 to wind the outside sticker 41 around the outer convolution of the backing paper to seal the roll in its assembled condition. As the applicator 152C comes to the top of its stroke, the box 152B has been moved to the bottom of its stroke since the two boxes 152C and B are linked together by means of arms 161 as shown in Figs. 23 and 24, box 152B being connected to the applicator arm 162 which, in turn, is connected to the left arm or link 161, Fig. 24, which is connected to the crank 161A mounted on the control shaft 161B. When the vacuum is released from boxes 152A and C, to apply the paster, the vacuum is turned on the box 152B to pick up a new length of paster, which was held by the stationary box 152A. Then, through the linkage 161 and arm 161A, the box 152B moves up bringing the cut paster up while box 152C is coming down. Now boxes 152B and 152C are in registry. The latch 158 then returns to holding position. The moistening roller 157, positioned in the water box 157a, is rocked against a constantly turning wheel 164 when arm 155 moves down by linkage not shown, and is moved against the applicator arm to moisten the paster when the arm moves upward. A calibrated adjustment 165 limits the pressure of the roller 157 against the applicator box 153C. A second calibrater adjustment 166 engages arm 167 pivoted at 168 and which carries the roller 157 to limit the pressure between rollers 157 and 164.

*Threader unit*

The threader, generally indicated by the numeral 176 and shown in Figs. 3 and 25–28, serves to thread the tongue or leading tapered end 35 of the backing paper 30 through the oriented slot 34 of reel 31a, and to guide the film 31 and the backing paper 30 into the space between the film flanges of the reel without ruffling or tearing either edge of the backing paper. It will be remembered from the above description, that the reel 31a has been oriented with slot 34 in a horizontal position when the spool was at the transfer station 85. Also, when the spool was moved from the transfer station 85 to the winding station 105, the spool slot 34 is retained in its horizontal position. In Fig. 26 the paper path 177 can be followed through the threader 176 where the paper first comes under the ratchet guide shoe 178 over an anti-backup lever 179 pivoted at 180 and spring actuated by a spring 181, between a constantly rotating feed roll 182 and the swinging pinch roll 183 carried by an arm 183A pivoted at 183B and actuated by cylinder 183C Fig. 4 through the paper cutting fold knife 184 carried by shaft 184A and then up through guides 185, 186, 187 and 188. Roll 182 is driven from a motor 182A, Fig. 10, which motor may be either electric or fluid. The knife 184 is pivoted with a moving cutting edge 189 which cooperates with a stationary knife edge 190. The film 31 moves along a straight horizontal path 191 to the threader 176, as best shown in Fig. 26 and passes a pair of anti-backup pawls 192, then between the film feed roller 193 and the swinging pinch roller 194, through the film chopper 195 and guides 196, 187 and 188 to the winding spindle 197 at the winding station 105. Chopper 195 is actuated by a cylinder 195A, Fig. 10 and comprises a fixed blade 195A' and a movable blade 195B pivoted at 195C, see Fig. 26a. The movable blade 195B has a slot 195D through which the paper passes, as best shown in Fig. 26a.

The anti-backup devices 179 and 192 are to prevent the film or paper from being pulled back out of the threader 176 by the looper tensions after the paper or film has been cut off. The cut off knife 184 is rocked counterclockwise by shaft 184A to move blade 189 into cooperating relation with blade 190, cutting the paper along line 33A between the tapered tongues 35 and 40 of adjacent sections, see Fig. 1. Shaft 184A is rocked by a gear sector 184B actuated by a cylinder 184C, Fig. 10. After the paper is cut, the blade 184 continuously rotates through 180° as shown in Figs. 27-28 to fold over the trailing tab or tongue 40. The knife 184 stays over, or is in the position illustrated in Fig. 28 until the fold has been pulled out through the guides 185 and 186 and wound onto the spool. The guide spring 198, of the shape shown in Figs. 26-28, serves to guide the leading edge or tongue 35 of the next paper strip between guides 185 and 186. The film chopper 195 swings down to chop the film strip off at the trailing edge 37. Simultaneous with the cutting of the film strip, the movable knife 195B moves below the film path to carry the portion of the film to the right of the knife below 191 to provide clearance for the application of the sticker 38 one end 37 as best shown in Fig. 26a.

The thread guide 188 serves to thread the tongue 35 of the backing paper horizontally and through the horizontally positioned slot 34 of the film reel, as is deemed apparent from an inspection of Fig. 26. The guide 188 guides the film and paper during the winding operation, but when the cutting and folding knife 184 comes over to sever and fold the paper, the guide 188 is lowered about ¼ inch to insure that the folded tongue does not come out as it comes out of the threader 176.

*Winder spindle unit*

The winding spindle 197 and tail center 210 at the winding station 105 hold the reel 31A with the slot 34 horizontally and in position to receive the film and paper during the winding operation, opens and closes to take successive reels, and starts and stops the winding cycle. To wind the paper and film successfully onto the positioned reel 31a without ruffling or tearing either edge of the paper, it is necessary to locate the spool 31a accurately. The driving center 206 of spindle 197 moves in and out on sleeve 207, the out position of which is established by a wedge stop 208 adjusted by a calibrated dial 209, see Fig. 17. This adjustment which can be recorded in the machine book determines the lateral position of the reel 31a, as is deemed apparent from an inspection of Fig. 17. The proper adjustment is when the paper comes to the reel centered between the flanges 33. To eliminate looseness at the tail center 210, the latter is made tapered and is spring urged into the reel by a return spring, not shown, in the chuck opening hydraulic cylinder 211. In addition to the sidewise position adjustment of the reel, it is necessary to make one other adjustment to correct for winding difficulties. This adjustment is made by calibrated knob 211A which moves the tail center 210 to the right or left. The adjustment procedure is to make the sidewise adjustment first by centralizing the spool with the threader 176, then with the paper winding towards the inside the flanges of the reel, the tail center 210 should be moved to the right, as viewed in Fig. 17, or vice versa. The correct adjustment of the tail center 210 is determined experimentally.

The driving center 206 is rotated by a hydraulic motor 212 through a sliding coupling 212a. The rotation of the motor is controlled by two solenoid valves 213 and 214, see Figs. 4 and 15, one valve 213 having a larger orifice than the other valve 214. When both valves are energized, the spindle speed is about 1800, but when valve 213 with the larger orifice is de-energized, the winding spindle speed drops from 1800 to a lower speed of approximately 400. When the second valve 214 is de-energized the spindle 197 stops. The purpose of this arrangement, will be later described.

Driving from the spindle 197 is a train of gears 215, Fig. 16, to gear 216 on shaft 217 which couples to the film feed roller 193 on the threader 176. This roll 193 is driven from spindle 197 so that the film will be moved at the corresponding lineal speed when fed onto the reel. Stop arm 218 engages stop wheel 219, Fig. 16, to lock the spindle 197 from turning while the paper is being threaded through slot 34 of the reel 31a. The spindle 197 starts up for winding when the stop arm 218 is swung out of engagement with wheel 219 by the hydraulic cylinder 220 linked to it. A control lever 221 pivoted at 223 is connected by a linkage 226 to a controlling cylinder 227 which raises lever 221 up at a time in the winding cycle when the spindle 197 is stopped and the paper and film are wound onto the reel. If the reel is too small in diameter the outer end 222 of lever 221 moves so high the lever will rock counterclockwise about its pivot 223 so that the left end 224 will engage and actuate microswitch 225. This action causes the machine to stop at the end of the cycle and a defective spool is dropped into reject hopper 113. This device is called the misthread detector and is most frequently actuated when the paper fails to enter the slot in the reel. It will also be actuated if, for any reason, the film should fail to feed into the spool.

*Winding cycle*

The roll 115 of backing paper is notched as shown at 43, Fig. 1, at spaced points along its length to provide the connected narrow tongues 35 and 40 between adjacent sections of backing paper. The machine is threaded up with the leading tongue 35 pushed into the threader 176 to the cut and fold knife 184. One paper length back, the next notch adjacent the control tongue 40 will then be at the paper track switch 230, as shown in Figs. 3 and 29. As the machine starts and the cam shaft 51 rotates, the paper pinch rolls 182 and 183 will be pinched together at 6° on the cam shaft. The paper will then move up through the threader 176, through the slot 34 in the spool at 55° when the pinch rollers 182 and 183 open to stop further feeding of the paper. The spindle indexing dog or stop 218 is pushed out of engagement at 50° at which time spindle 197 starts to rotate at 1800 R. P. M. as shown diagrammatically on the winding spindle speed chart, Fig. 32. While the notch 43 in the backing paper is moved from switch 230 to 231, only the leading portion 36 of the backing paper is being wound onto the reel. When switch 231 drops into the paper notch 43, the film-tucking solenoid 232, Figs. 4 and 10, is energized which actuates the pinch feed rolls 193 and 194 and starts the film feeding into the spool. The switch 231 is in the paper notch for approximately 2 inches of paper travel, which is sufficient to move the film forward one and three-quarter inch to the spool and another one-quarter inch to make sure that the film is caught in the nip of paper at the spool and will be pulled by the spool from that point on. When the notch in the paper reaches switch 233, the latter drops into the notch, and the high speed solenoid 213 is de-energized thereby slowing the spindle 197 from 1800 R. P. M. to 400 R. P. M. When the switch 234 drops into the paper notch 43, the low speed solenoid 214 is also de-energized and the spindle 197 stops abruptly. Switches 233 and 234 are located along the adjustable mounting 235 in such a position that the proper place to cut off the film is now at the film chopper 195. At this time, 190° on the cam shaft, the film chopper 195 goes down and the #1 paster applicator 142D comes down to apply the #1 paster 38, one-half overhanging the trailing cut end 37 of the film in Fig. 26a. At 22° the spindle 197 starts up again to wind the paper trailer 39 onto the spindle, and as the next notch in the paper gets to switch 236, the latter drops into the paper notch and the high speed solenoid valve is de-energized again dropping the speed from 1800 R. P. M. to 400 R. P. M. When switch 230 drops into the paper notch, the slow speed solenoid is de-energized and the spindle 197 stops abruptly. The notch at the end of the paper being wound is now at the cut-off and fold knife 184 which comes over at 270°, timed by timing switch 237 on the cam shaft in Figs. 5 and 31a, which starts the spindle 197 up at 400 R. P. M. pulling the folded tongue 49 out of the threader 176 and at 299° the outer paster 41 is tripped up to wrap the outside paster 41 around the finished spool. At 346° the spindle 197 stops when the arm or indexing dog 218 engages the spindle and the winding centers 206 and 210 open at 355° to drop out the finished spool.

As all the switches which cooperate with the paper notches 43 may be identical in structure, only one will be described in detail. Referring now to Fig. 30, the paper web 30 is shown with an edge overlying and supported on the lower roller 241 of any suitable material. These switches may be in the form of the well known microswitch provided with an operating arm 242 by which the switch may be actuated as is well known. This arm 242 may have connected thereto, or suitably associated therewith, a roller 243 which is adapted to ride on and be supported in Fig. 30. However, when the notch 43 in the backing paper arrives in registry with the roller 243, the backing paper no longer serves as a support for the roller, and the latter drops down to actuate the associated microswitch. As these microswitches are well known and do not form, per se, a part of the present invention, further details are not deemed necessary.

*Automatic stops*

A number of automatic inspection devices are incorporated in the design of the machine, so that the operator need not be in constant attention and yet no defective product will go out.

The first of these devices is the defective reel inspection that takes place at the transfer station 85, previously described. If the slot inspection blade 102 fails to enter the spool slot 34, then the switch 244 connecting 245 and 246 will be closed when 247 closes at 260° on the cam shaft. Relay 109 will become energized in this case at 210° on the following machine cycle. During the remainder of the cycle in which the defective reel is rejected, the spool continues without interruption, but at the end of the cycle 249 opens at 0° and since 109 is energized, the contacts between terminate 250—251 are open, the spooling relay 252 and the solenoid valves 111 parallel with it become de-energized. These valves 111 shut off the flow of pressure oil to the two upper manifold sections 65, Fig. 15, thereby holding off the threading of the paper, feeding of the film and pasters, and turning of the winding spindle 197, but not interfering with the transfer of the defective spool to the winding station 105, retraction of centers 206 and 210, and an inspection of the following reel. If this next reel was found to be acceptable, the blade 102 enters the slot 34, and relay 109 is de-energized when 248 opens at 210°. Contacts on 109 between terminals 250—251 are closed and relay 252 picks up at 351° and oil is again supplied to the upper manifold 65 and spooling begins again without any attention required by the operator.

Because 109 was energized for one cycle, 109 contacts were closed between 253 and 254, and relay 255 was then energized for one cycle starting at 180° by 256 nearly one cycle later than that during which 109 was energized. The purpose of this is to operate the reject trap door 114 after the defective reel has been dropped out of the centers 206—210 at the end of the cycle and has had time to run down the shoot 257. The trap door 114 is operated by the reject solenoid valve 258 which is energized in this case by the 255 contacts between contacts 259—260.

No reels, or the absence of reels, at the transfer station 85 is detected by the slot blade 102 going in further than normal and actuating slot inspection switch #2–261 to close the contacts between 261—262 and energizing relay 73 (R4) which seals itself in and stays energized. Normally closed contacts on 273 (R4) are open and relay 264 then drops out at 340° when 265 opens. The latter was installed to eliminate false stops caused by instantaneous opening of any of the contacts between 266 and 267. The dropping out of 264 causes 268 to be dropped out at the end of the cycle and the cam shaft 51 then stops at 0°. A low voltage indicator light 269, located after the reel transfer, is illuminated by a small transformer 270 in parallel with the coil 273 (R4). This light stays illuminated until the trouble has been taken care of, and when starter button 271 is pushed, contacts on the starter button open the circuit at lines 272 resetting any automatic stop relays 273 (R4—R10). A contact on 273 (R4) between 276 and 245 energizes the defective reel circuit to hold off the feeding of paper, film and pasters to empty the winding spindle 197 on the machine cycle following the one where there was no reel at the transfer station 85.

Outside paster feed trouble causes a loss of vacuum, closing contacts 277 between terminals 277–78, energizing 273 (R5) lighting the lights 275, stopping the machine at the end of the cycle, as described above, for no reels.

A misthread is detected by the spool diameter switch 225 associated with the winding spindle 197, see Fig. 17. If the spool is not up to normal diameter at the time the spindle 197 is stopped to chop off the film, the diameter switch 225 is closed between 272–79, and relay 273 (R7) is pulled in lighting the misthread indicator lamp 280 and stopping the machine at the end of the cycle. Contacts 273 (R7) between 259—254 energize 255, which, in turn, energizes the reject valve 258 to put the empty reel or undersized spool in the reject hopper 113.

The #1 paster is detected by the presence of vacuum on the applicator arm 142D, Figs. 17 and 22, while the paster is being applied. Lack of vacuum at this point closes contacts 282 between 252a—284; and, at the same time, 285 is closed between 168°–201° on the cam shaft 51 if contacts 252a are closed. This energizes 273 (R8), #1 paster lights, stops the machine at the end of the cycle, and puts the spool which may not have a #1 paster in the reject hopper 113. A second possibility for the #1 paster being missed is caused by slow winding in which case the film is moved at the time of the film chopping and the #1 paster is applied to the stationary blade 195a of the chopper 195 instead of to the film. A circuit has been included to check for slow winding and comprises a cam shaft switch 287, see Fig. 31a connected from solenoid valve 214 to relay 273 (R6), terminals 288—288a. If the paper notch has not reached paper switch 234 at the time the #1 paster is being applied, the spool slow-down valve 214 will be energized and 273 (R6) will be picked up through 237 at 188–190°. Relay contacts 289 between 272 and 284 pick up relay 273 (R8) and the same events take place as though the #1 paster were missing on the applicator arm 142D. Relay contact 252a is included in the circuit between 291 and 283 so that the expected lack of vacuum on the applicator arm 142D during the cycle when a defective reel is in the spindle will not shut the machine down unnecessarily. No paper is detected by the microswitch 124, see Fig. 3, at the bottom of the paper looper arm travel which pulls in relay 273 (R9), lights the no paper indicator 292 and stops the machine at the end of the cycle.

No film is detected by microswitch 136, see Fig. 3, at the left hand travel limit of the film looper arm 134, and pulls in relay 273 (R10), lights the no film indicator light 293, and stops the machine at the end of the cycle.

Spool for inspection

There is as part of the hydraulic cam system previously described cam 294 (#8 cam counting up from the bottom lefthand side, Fig. 5) which rotates one revolution while the rest of the cams rotate 100 revolutions. The valve 66 operated by this cam controls the hydraulic cylinder 295, see Fig. 10, on the trap door 296, see Fig. 19, for hopper 297, see Figs. 3 and 19. The machine may be run, for example, with two diametrically opposite notches on the sample cam 294 taking out every fiftieth spool for inspection. Inspection trap door 296 is notched and the machine so timed that if both trap doors 114 and 296 open on the same cycle, the rejected trap door 114 opens first and locks inspection door 296 from opening. In this way a known defect is not taken as a sample.

Counters

There are three counters, 298, 299, 300, shown in the upper left hand corner, Fig. 3. The top counter 298 is labeled "Machine cycles" and adds a count every time the cam shaft rotates one revolution. The middle counter, 299, is labeled "Spooling cycles" and add a count for every cam shaft revolution during which there was pressure oil on the upper manifold section 65, and it was expected film was being spooled. The difference between the upper counter and the middle counter is accounted for by the number of defective reels plus no reels. The lower counter 300 is labeled "Good spools" and is the same as the middle counter except that misthreads are prevented from being counted by the "no count" valve 301. Spools without #1 paster are counted as good spool counts 300 because they are put in a special tray for 100% and will be repaired. Open spools that fail to seal and spools that are opened up at the machine must be counted by the operator for the bottom counter 300 to agree with the actual number of good spools in the finished work.

Strobelight

Figure 5:
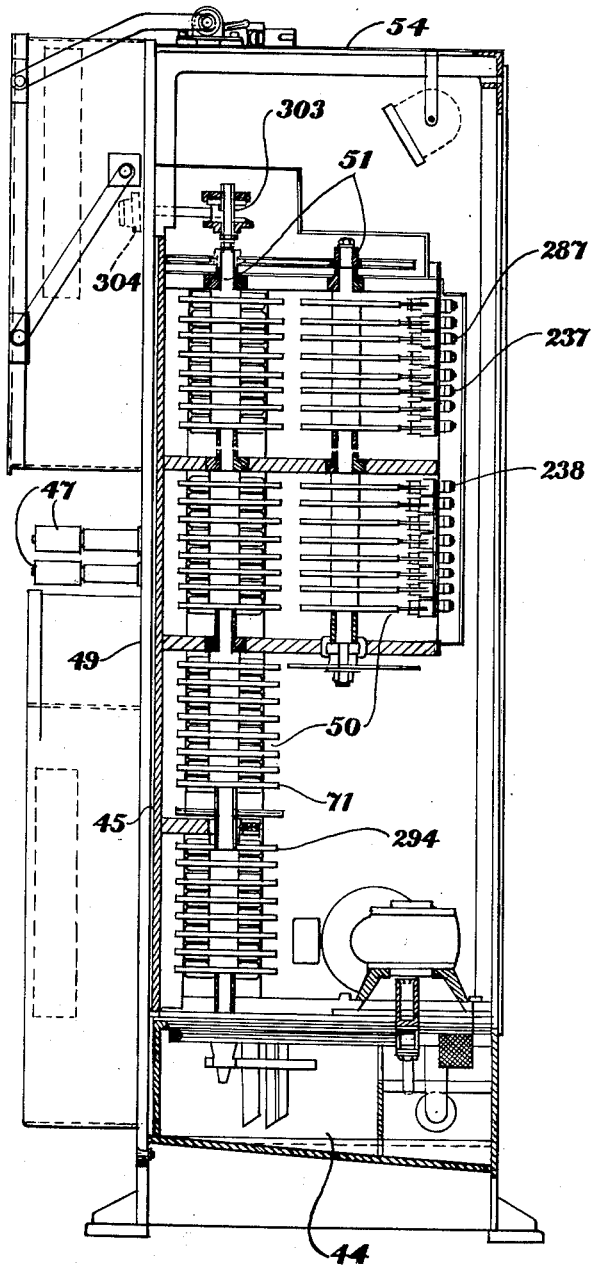
Fig. 5 is an end elevation view of the machine, taken from the left of Fig. 4, with the housing in section, showing the arrangement of the cam shafts and the control cam.
Figure 6:
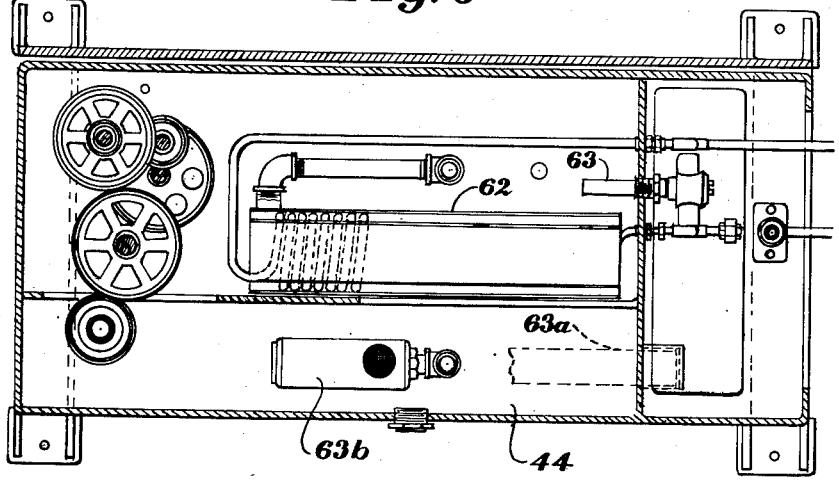
Fig. 6 is a plan view, with the housing in section, of the bottom of the machine showing the cooling coils, thermostat filter and heater for the oil sump.

Incorporated in the design of this spooling machine is a timing light mechanism to aid in adjusting the troubleshooting. A differential and microswitch 303, Fig. 5, is mounted on the top extension of the main vertical cam shaft 51 and is arranged so that the switch 303 is closed once every revolution. The point in the cycle where this switch closes can be changed while the machine is running and is set by a dial 304, Fig. 5, on the front of the machine. The dial 304 is calibrated from 0 to 360°. When the dial 304 is set at 120°, the switch 304 closes at 120° on the cam shaft. A rectifier condenser unit, not shown, is attachable to the electric box 305, Fig. 3, through a plug, not shown, on the side of the box 305. This lamp unit is a Strobotron flash tube and is enclosed to protect it mechanically and provide a safe light filter so that one flash directly on the film will not fog it. In use the lamp is held adjacent some moving mechanism, such as the #1 paster applicator 142D and either its position at a given cam shaft angle or the cam shaft angle for a particular position in the applicator can be easily determined.

The operation of the machine may be briefly summarized as follows: the film reels 31a are fed down the inclined track to the transfer station 85 at which point the reel is rotated slowly and the blade 102 is moved or inserted into the slot 34 of the reel. This insertion stalls the reel drive means and positions or orients the film reel with the slot horizontally. The reel with its positioned slot is then transferred to the winding station 105 where it is connected to the drive spindle 197, the reel remaining stationary with the slot horizontally.

The backing paper 30 is supplied from a stock roll 115 and is passed under a guide 117, over rollers 120, and the looper arm 118. The paper then passes over a series of control switches 230, etc., and is then threaded into the threader 176 until the tongue 35 is positioned at the cutting knife 184. The film is supplied from a supply reel 130, is passed over fixed roller 132, and movable rollers 133 carried by arm 134. The film is then fed horizontally to the threader 176. In the initial portion of the cycle, the paper 30 is fed through a threader 176 to move the tongue 35 through a reel slot 34 and to wind up the leader portion 36 of the backing paper. Then the film and paper are fed as a unit and wound up in interleaving convolutions on the spool at the winding station. When the proper length of film has been wound, the chopper 195 is actuated to cut the film and the film fed is stopped, and the #1 paster mechanism is operated to apply the paster 38 to the end 37 of the film strip. This paster serves to secure the trailing end of the film strip adhesively to the backing paper. Although the film feed stops, the paper continues to wind up the trailer portion 39 of the backing paper. When the trailer tongue 40 reaches the knife 134, the latter folds over the tongue to position the latter inside the outer paper convolutions in the wound roll. When the folded over tongue is wound up, the outside paster mechanism, Fig. 23, is then actuated to apply the outer paster 41 to the outer surface of the wound roll to retain the roll in its wound condition. The winding is automatic and the paper, film and pasters move in proper timed sequence to provide the wound spool with a minimum of attention on the part of the operator. The film and paper speed, as well as the speed changes, are controlled by means of microswitches which cooperate with the notches 43 spaced along the backing paper and formed by cut-out tongues 35 and 40, see Fig. 1.

Besides costing less to build than prior fully automatic machines, the machine of the present invention will have a higher quality level of finished product because of the improved winding method. Also, the present machine will operate at a materially increased cycle per minute, thus materially increasing production. In addition, this new machine can be changed very readily from 620 size to 120 size film and can be easily altered to spool longer or shorter lengths of paper and film such as six or ten exposures instead of eight. The automatic stops and automatic inspection devices will enable one operator to tend a group of such spooling machines. Since hydraulic approach provides a machine which is readily accessible for maintenance work, uses cams which are inexpensive and easy to move or alter, and because the mechanisms are hydraulically operated they are not likely to be damaged by jams. By the same token the machine contributes to the safety of the operator as well as the mechanisms. As most of these adjustments are calibrated, the history of such adjustments is available from one trick to another.

The present invention thus provides a new and improved film spool machine which is fully automatic, properly positions the film reel, winds the film and paper on the reel in proper timed sequence, cuts the film and paper in proper lengths, connects the paper to the reel, connects the film to the paper and seals the completely wound spool. In addition, various controls and special devices are employed so as to necessitate the minimum of attention on the part of the operator. While in the above description hydraulic means, such as oil, is described for use in operating many of the mechanisms, this is by way of illustration only as it is apparent that other hydraulic materials, such as water, are equally well adapted for such use. It is also apparent that pneumatic materials, such as air under pressure, could also be employed. Therefore, the present invention is not to be limited to hydraulic means, but, on the contrary, is intended also to cover any suitable fluid means.

While one embodiment of the invention has been disclosed, it is to be understood the inventive idea may be carried out in a number of ways. Therefore, the present invention is not to be limited to the precise details described, but is intended to cover all variations and modifications which fall within the scope of the appended claims.

What we claim and desire to secure by Letters Patent of the United States is:

1. An automatic roll film spooling machine for winding a strip of backing paper and a strip of sensitized film in interleaving relation onto a film reel provided with a slotted core, comprising, a winding station, means to position said reel at said station, means at said station to rotate said reel to wind said paper and film strips onto said reel to provide a film spool, means to guide said film and said paper strips toward said station and in a definite relation thereto, electric means actuated by said paper to control the speed of said rotating means, and stationary means for guiding an end of said paper into the core slot.

2. An automatic roll film spooling machine for winding a strip of backing paper and a strip of sensitized film in interleaving relation onto a film reel provided with a slotted core, comprising a winding station, means to position said reel at said station, hydraulic actuated means for rotating said reel at said station, means to guide said paper and said film toward said station, means actuated by said paper for controlling the speed of said rotating means, and stationary guide means adjacent said station for guiding the leading end of said paper strip through said slot to connect said paper to said reel core.

3. In an automatic roll film spooling machine for winding a strip of backing paper and a strip of sensitized film in interleaving convolutions onto a film reel provided with a slotted core, the combination with a supply of paper in the form of a web and a supply of film in the form of a web, a winding station at which the reel is positioned, means for rotating said reel at said station, of a single threader for directing both of said webs toward said station, means on said threader for severing independently both of said webs to form paper and film strips of predetermined lengths, stationary means for guiding the leading end of said paper web into the slot of said core, a paster for securing one end of the film strip to the paper strip, and vacuum means for supplying and applying said paster to said film end.

4. In an automatic roll film spooling machine for winding a strip of backing paper and a strip of sensitized film in interleaving convolutions onto a film reel provided with a slotted core, the combination with a supply of paper in the form of a web and a supply of film in the form of a web, a winding station at which the reel is positioned, means for rotating said reel at said station, of a single threader for directing both of said webs toward said station, means on said threader for severing independently both of said webs to form paper and film strips of predetermined lengths, stationary means for guiding the leading end of said paper web into the slot of said core, a paster for securing one end of the film strip to the paper strip, vacuum means for supplying and applying said paster to said film end, and switch means positioned in the path of and by said paper web for adjusting said rotating means to vary the winding of said webs on said reel.

5. An automatic roll film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and said paper strips toward said station and in a definite relation thereto, electric means actuated by said paper to control the speed of said rotating means, stationary means for guiding an end of said paper into the core slot, and control means for said rotating means to stop the latter upon improper functioning of the machine.

6. In an automatic roll film spooling machine for winding a strip of backing paper and a strip of sensitized film in interleaving convolutions onto a film reel provided with a slotted core, the combination with a supply of paper in the form of a web and a supply of film in the form of a web, a winding station at which the reel is positioned, means for rotating said reel at said station, of a single threader for directing both of said webs toward said station, means on said threader for severing independently both of said webs to form paper and film strips of predetermined lengths, stationary means for guiding the leading end of said paper web into the slot of said core, a paster for securing one end of the film strip to the paper strip, means on said threader adjacent the severing means for said paper web to fold over a trailing end of the severed paper strip, vacuum means for supplying and applying said paster to said one end of said film strip, and means adjacent the film severing means to move the film web adjacent said film end out of the plane of said film strip at said film end.

7. In an automatic roll film spooling machine for winding a strip of backing paper and a strip of sensitized film in interleaving convolutions onto a film reel provided with a slotted core, the combination with a supply of paper in the form of a web and a supply of film in the form of a web, a winding station at which the reel is positioned, means for rotating said reel at said station, means to direct said paper and film web toward said station, stationary guide means adjacent said station for guiding a leading edge of said paper web through said core slot to attach said paper web to said reel, vacuum means including a reciprocating vacuum member for supplying a paster web, means to sever said paster web to form a separate paster, and vacuum means to apply said paster to an end of the severed film strip to attach said film strip to said paper strip.

8. An automatic roll film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and said paper strips toward said station and in a definite relation thereto, a supply of an adhesively coated web, means for severing said web into individual portions of a definite length adapted to be applied to an end of the film strip, a reciprocating vacuum member for drawing said coated web from said supply and across said severing means, vacuum means positioned on opposite sides of said severing means to hold said coated web taut during the severing thereof, means for rocking one of said last-mentioned vacuum means to apply the severed paster to an end of said film strip to connect the latter adhesively to said paper strip, and means for controlling the application of vacuum to said vacuum means.

9. An automatic roll film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and said paper strips toward said station and in a definite relation thereto, a paster for attaching one end of the film strip to the paper strip, vacuum means for supplying and applying said paster to said film end, stationary means for directing the leading end of the paper strip into said slot to connect said strip to said core, and electric switches positioned in the path of and controlled by said paper strip to control the speed of said rotating means.

10. An automatic roll film spooling machine for winding a strip of backing paper and a strip of sensitized film in interleaving convolutions onto a film reel provided with a slotted core, a paper web supply, a transfer station, a film web supply, means to supply reels to said transfer station, means to orient the reel slot at said station, a winding station, a reciprocating carriage means to transfer the oriented reel from said transfer station to said winding station, means to feed both of said webs toward said reel at said winding station, means to direct one end of said paper web into the slotted core to attach said paper web to said core, separate means for severing film and paper web to provide film and paper strips of definite lengths, means adjacent the paper severing means to fold over the other end of the severed paper strip, means to rotate said reel at said winding station to wind the severed paper and film strips thereon, a paster for attaching an end of the severed film strip to the paper strip being wound onto said reel, vacuum means for supplying and applying said paster to said film end, and means controlled by the paper strip for varying the speed of rotation of said reel rotating means.

11. An automatic roll film spooling machine for winding a strip of backing paper and a strip of sensitized film in interleaving convolutions onto a film reel provided with a slotted core, a paper web supply, a transfer station, a film web supply, means to supply reels to said transfer station, means to orient the reel slot at said station, a winding station, means to transfer the oriented reel from said transfer station to said winding station, means to feed both of said webs toward said reel at said winding station, fixed means to direct one end of said paper web into the slotted core to attach said paper web to said core, separate means for severing said film and paper webs to provide film and paper strips of definite lengths, means adjacent the paper severing means to fold over the other end of the severed paper strip, means to rotate said reel at said winding station to wind the severed paper and film strips thereon, a paster for attaching an end of the severed film strip to the paper strip being wound onto said reel, vacuum means for supplying and applying said paster to said film end, means controlled by the paper strip for varying the speed of rotation of said reel rotating means, and control means connectable to said rotating means for stopping the rotation of said reel upon failure of any part of the machine to function properly.

12. An automatic roll film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and paper strips toward said station and in a definite relation thereto, stationary means to guide an end of said paper strip into the slot of said core to attach said paper strip to said core, an outside paster adapted to be applied at the winding station to the outer surface of a wound spool, and means including a reciprocal vacuum member for supplying and applying said paster.

13. An automatic roll film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and said paper strips toward said station and a definite relation thereto, means to guide an end of said paper strip into the slot of said core to attach said paper strip to said core, a supply of an adhesively coated web, means for severing said web into pasters of a definite length, reciprocal vacuum means for supplying said web to said severing means, and reciprocal vacuum means for moving and applying the severed paster to the outer surface of the wound spool.

14. An automatic rool film spooling machine for winding a strip of backing paper and a strip of sensitized film in interleaving relation onto a film reel provided with a slotted core, comprising a winding station, means to position said reel at said station, means at said station to rotate said reel to wind said paper and film strips onto said reel to provide a film spool, means to guide said film and said paper strips toward said station and a definite relation thereto, means to guide an end of said paper strip into the slot of said core to attach said paper strip to said core, a supply of an adhesively coated web, means including a knife for severing said web into pasters of a definite length, vacuum means for supplying said web to said severing means, a movable vacuum member for drawing said coated web from said supply, a stationary vacuum member positioned on one side of the knife and a movable vacuum member on the other side of the knife to hold the web taut during severing by said knife, means to move said first vacuum member to draw said web across said knife and in registry with said second movable vacuum member, means to transfer vacuum from said first movable member to said stationary member and said second movable member to hold said web across said knife during severing to form a separate paster, and means for applying the separated paster to the outer surface of the wound roll.

15. A fluid operated automatic roll film spooling machine for winding a strip of backing paper and a strip of sensitized film in interleaving convolution onto a film reel formed with a slotted core to provide a film roll, comprising a transfer station to which reels are delivered successively, means at said station for orienting the slot of said reel, a winding station, means to transfer said oriented reel from said transfer station to said winding station, means at said winding station for rotating said reel to wind said strips on said reel, a motor for moving said paper strip, means to move said film strip, a paster, means to apply said paster to said film strip, fluid actuated members for all of said means and cam means for controlling said fluid actuated members to actuate all of said other means in proper timed relation.

16. A fluid operated automatic roll film spooling machine for winding a strip of backing paper and a strip of sensitized film in interleaving convolution onto a film reel formed with a slotted core to provide a film roll, comprising a transfer station to which reels are delivered successively, means at said station for orienting the slot of said reel, a winding station, means to transfer said oriented reel from said transfer station to said winding station, means at said winding station for rotating said reel to wind said strips on said reel, a motor for moving said paper strip, means to move said film strip, a paster, means to apply said paster to said film strip to attach the latter to said film strip, a second paster, means to apply the second paster to the outer surface of the wound roll, fluid actuated means for operating all of said other means in proper timed relation.

17. A fluid operated automatic roll film spooling machine for winding a strip of backing paper and a strip of sensitized film in interleaving convolutions onto a film reel formed with a slotted core to provide a film roll, comprising a transfer station to which reels are delivered successively, means at said station for orienting the slot of said reel, a winding station, means to transfer said oriented reel from said transfer station to said winding station, means at said winding station for rotating said reel to wind said strips on said reel, a motor for moving said paper strip, means to move said film strip, a paster, vacuum means for moving and holding said paster, means for severing and applying said paster to said film strip to attach the latter to said paper strip, an outside paster, vacuum means for feeding and holding said second paster, means to sever said second paster and to apply the latter to the outer surface of the wound roll, fluid means for actuating all of said other means, and cam means for operating said fluid means in proper timed relation.

18. A fluid operated automatic roll film spooling machine for winding a strip of backing paper and a strip of sensitized film in interleaving convolutions onto a film reel formed with a slotted core to provide a film roll, comprising a paper web supply, a film web supply, a winding station at which a reel is positioned to receive said strips, means for feeding said paper web, means for feeding said film web, separate means for severing the webs into strips, a paster web supply, reciprocal vacuum means for feeding said paster web, means to sever the last-mentioned web to form a paster, rockable vacuum means to apply said paster to said film strip to attach the latter to said paper strip, a second paster web, rockable vacuum means for feeding said second paster web, means for severing the last-mentioned web to provide an outside paster, means to apply said outside paster to said wound roll, fluid actuating means for operating at least certain of said other means, and constantly rotating cam means for controlling said actuating means in a definite timed relation.

19. A roll film spooling machine comprising, in combination, a reel transfer station adapted to receive a film reel having a core formed with a slot, an inclined guide positioned adjacent said station for supporting a plurality of reels and for feeding said reels separately to said station, slip drive means for rotating the reel when positioned at said station, means cooperating with the core slot for orienting the slot while said reel is at said station, a rockable member movable to one position to retain said reels on said guide and movable to another position to release the lowermost reel for movement to said station, and means movable with said rockable member to position a reel at said station.

20. A roll film spooling machine comprising, in combination, a reel transfer station to receive a film reel having a core formed with a slot, an inclined guide positioned adjacent said station for supporting a plurality of reels and for feeding said reels separately to said station, slip drive means for rotating the reel when positioned at said station, a pivoted bifurcated member in one position engaging the lowermost reel on said guide to support said reels on said guide, said member being movable to another position to release the lowermost reel to allow the latter to move down said guide to said station, means to connect said drive means to the released reel moved to said station to rotate the latter reel, a spring member operatively connected to and movable with said pivoted member and when said pivoted member is in reel supporting position engaging the reel at said station to move the released reel into position to be engaged by said drive means, said spring means being moved out of reel engaging when said pivoted member is moved to reel releasing position, a blade movable into the slot of said core to orient said reel and to hold the latter against further movement by said drive means, and means for moving said pivoted member and blade in timed relation to orient the reel at the station with the core slot in a definite position.

21. An automatic roll film spooling machine for winding a strip of backing paper and a strip of film in interleaving convolutions onto a film reel provided with a core formed with a slot comprising a transfer station, means at said station for orienting the reel with the slot therein in a definite position, a winding station, a reciprocating carriage means to position the oriented reel at said winding station, a web supply of paper, a web supply of film, separate means for feeding said webs, means for severing predetermined length of said webs to form said strips, means to apply a paster to said film strip to attach the latter to said paper strip, means to apply a paster to the outer surface of the wound roll, electrical circuits controlled by the various means, and means controlled by said circuits for stopping the reel rotating means at said station upon failure of any of the prior means.

22. An automatic roll film spooling machine for winding a strip of backing paper and a strip of film in interleaving convolutions onto a film reel provided with a core formed with a slot, comprising, a transfer station, means to feed reels successively to said transfer station, means to orient each reel at said station to position the core slot in a definite relation, a winding station, means to position the oriented reel at said winding station, means to rotate said reel at said winding station, a paper web supply, a film web supply, separate means for feeding said webs, means for severing each web to form the film and paper strips, means for supplying a paster, means for applying said paster to said film strip to attach the latter to said paper strip, means for supplying an outside paster, means for applying the outside paster around the outer surface of a wound spool, means for actuating said various means in timed relation, and control means for stopping the winding means for said spool at said winding station upon failure to position a reel at or delivering a defective reel to said winding station, failure to feed paper or film, and failure to supply the pasters so as to prevent the partial or improper formation of a roll.

References Cited in the file of this patent

UNITED STATES PATENTS

| | | |
|---|---|---|
| 1,532,753 | Jones | Apr. 7, 1925 |
| 2,085,439 | Morlock | June 29, 1937 |
| 2,190,529 | Bretschneider | Feb. 13, 1940 |
| 2,247,718 | Treckmann | July 1, 1941 |
| 2,398,639 | Heyer | Apr. 16, 1946 |
| 2,598,950 | Walker | June 3, 1952 |
| 2,609,156 | Kimpton | Sept. 2, 1952 |
| 2,618,954 | Dourdeville | Nov. 25, 1952 |
| 2,622,655 | Todd | Dec. 23, 1952 |
| 2,668,023 | Whitson et al. | Feb. 2, 1954 |
| 2,674,490 | Richards | Apr. 6, 1954 |
| 2,701,177 | Van Rennes | Feb. 1, 1955 |